(12) United States Patent
Fukagawa et al.

(10) Patent No.: US 11,001,726 B2
(45) Date of Patent: May 11, 2021

(54) PRINTING PRETREATMENT LIQUID, BASE MATERIAL FOR PRINTING, METHOD OF PRODUCING BASE MATERIAL FOR PRINTING, INK SET, IMAGE RECORDING METHOD, AND IMAGE RECORDED MATERIAL

(71) Applicant: FUJIFILM CORPORATION, Tokyo (JP)

(72) Inventors: Kiyotaka Fukagawa, Kanagawa (JP); Akinori Sugishima, Kanagawa (JP); Yusuke Fujii, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/904,536

(22) Filed: Jun. 17, 2020

(65) Prior Publication Data

US 2020/0317944 A1 Oct. 8, 2020

Related U.S. Application Data

(63) Continuation of application No. PCT/JP2018/047307, filed on Dec. 21, 2018.

(30) Foreign Application Priority Data

Dec. 27, 2017 (JP) .............................. JP2017-252307

(51) Int. Cl.
*C09D 11/54* (2014.01)
*B41M 5/00* (2006.01)
(Continued)

(52) U.S. Cl.
CPC ............ *C09D 11/54* (2013.01); *B41M 5/0017* (2013.01); *B41M 5/0064* (2013.01); *B41M 5/5254* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2005/0134667 A1 6/2005 Campbell et al.
2009/0318613 A1\* 12/2009 Ageishi ................ B41M 5/0256
524/588

(Continued)

FOREIGN PATENT DOCUMENTS

JP H09-165552 A 6/1997
JP H11-268401 A 10/1999
(Continued)

OTHER PUBLICATIONS

International Search Report issued in International Application No. PCT/JP2018/047307 dated Feb. 26, 2019.
(Continued)

*Primary Examiner* — Manish S Shah
(74) *Attorney, Agent, or Firm* — Solaris Intellectual Property Group, PLLC

(57) ABSTRACT

Provided are a printing pretreatment liquid for a polyester base material including a polymer which has a Hansen solubility parameter value of 18 $MPa^{0.5}$ to 30 $MPa^{0.5}$, water, and at least one aggregating agent selected from the group consisting of a polyvalent metal salt, an organic acid, a cationic compound, and a metal complex, and applications thereof

16 Claims, 2 Drawing Sheets

(51) Int. Cl.
*B41M 5/52* (2006.01)
*C09D 11/322* (2014.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 2/04588; B41J 2/04595; B41J 2/04586; B41J 2/14274; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106

See application file for complete search history.

(56) References Cited

U.S. PATENT DOCUMENTS

| | | | | |
|---|---|---|---|---|
| 2011/0205289 | A1* | 8/2011 | Irita | C09D 11/40 |
| | | | | 347/21 |
| 2014/0092168 | A1* | 4/2014 | Ito | B41J 2/16552 |
| | | | | 347/21 |
| 2015/0191613 | A1* | 7/2015 | Tojo | C09D 11/107 |
| | | | | 347/20 |
| 2016/0222238 | A1 | 8/2016 | Arai et al. | |
| 2016/0333209 | A1* | 11/2016 | Shimono | B41M 5/0017 |
| 2017/0349774 | A1* | 12/2017 | Shimono | B41M 5/0017 |

FOREIGN PATENT DOCUMENTS

| | | | |
|---|---|---|---|
| JP | 2016-30337 A | 3/2016 | |
| JP | 2016-145312 A | 8/2016 | |
| JP | 2017-13350 A | 1/2017 | |
| WO | 2016/136914 A1 | 9/2016 | |
| WO | WO-2016136914 A1 * | 9/2016 | ............ C09D 11/54 |
| WO | 2017/163738 A1 | 9/2017 | |

OTHER PUBLICATIONS

Written Opinion of the ISA issued in International Application No. PCT/JP2018/047307 dated Feb. 26, 2019.
Extended European Search Report dated Feb. 11, 2021, issued in corresponding EP Patent Application No. 18895315.2.

* cited by examiner

2pt  3pt  4pt

2mm

PRINTING PRETREATMENT LIQUID, BASE MATERIAL FOR PRINTING, METHOD OF PRODUCING BASE MATERIAL FOR PRINTING, INK SET, IMAGE RECORDING METHOD, AND IMAGE RECORDED MATERIAL

CROSS-REFERENCE TO RELATED APPLICATIONS

This application is a continuation application of International Application No. PCT/JP2018/047307, filed Dec. 21, 2018, the disclosure of which is incorporated herein by reference in its entirety. Further, this application claims priority from Japanese Patent Application No. 2017-252307, filed Dec. 27, 2017, the disclosure of which is incorporated herein by reference in its entirety.

BACKGROUND OF THE INVENTION

1. Field of the Invention

The present disclosure relates to a printing pretreatment liquid, a base material for printing, a method of producing a base material for printing, an ink set, an image recording method, and an image recorded material.

2. Description of the Related Art

A recording method carried out using an ink jet method has been widely used because high-quality images can be recorded on various base materials by jetting an ink in the form of liquid droplets from a plurality of nozzles provided in an ink jet head.

Various forms of image recording methods carried out using an ink jet method have been suggested.

For example, a method of using an ink set formed by combining an ink that contains water and a colorant with a printing pretreatment liquid that contains an aggregating agent which allows components in the ink to aggregate has been known. According to this method, for example, an image with a high resolution can be formed by bringing the ink and the printing pretreatment liquid into contact with each other.

For example, JP2017-013350A discloses a recording method including: a first drying step of coating a medium to be recorded with a pretreatment liquid and drying the liquid at a drying temperature T1; a second drying step of adhering an ink composition to the medium to be recorded, which has been coated with the pretreatment liquid, and drying the ink composition at a drying temperature T2; and a third drying step of coating the medium to be recorded, to which the ink composition has adhered, with a post-treatment liquid and drying the liquid at a drying temperature T3, in which the pretreatment liquid contains a resin having a glass transition temperature of Tg1, the ink composition contains a resin having a glass transition temperature of Tg2, the post-treatment liquid contains a resin having a glass transition temperature of Tg3, and a relationship (1) of Tg1<Tg2<Tg3 and a relationship (2) of T1<T2<T3 are satisfied.

Further, JP2016-030337A discloses a recording device comprising: a jetting head that jets an ink which contains a colorant, polymer particles, water, and an aqueous organic solvent and has a static surface tension of less than 30 mN/m and in which the fluctuation range of a dynamic surface tension from 1 msec to 1 sec at the time of measurement of the dynamic surface tension according to a maximum foaming pressure method is 0.2 mN/m to 3.0 mN/m to a base layer of an impermeable recording medium that includes the base layer whose at least one surface contains one polymer compound selected from the group consisting of polyurethane, polyester, polyvinyl chloride, and polyolefin.

SUMMARY OF THE INVENTION

A polyethylene base material is a recording medium to which an ink containing a colorant and water is unlikely to permeate.

As the result of intensive examination conducted by the present inventors, it was found that the adhesiveness of an image to a polyester base material is not sufficient based on the findings obtained by applying a treatment liquid or the like to the polyester base material and performing recording of the image using an ink that contains a colorant and water according to the techniques described in JP2017-013350A and JP2016-030337A.

Accordingly, an object to be achieved by an embodiment of the present disclosure is to provide a printing pretreatment liquid that enhances the adhesiveness between a polyester base material and an image recorded using an ink containing a colorant and water.

Further, an object to be achieved by another embodiment of the present disclosure is to provide a base material for printing in which the adhesiveness of an image recorded using an ink containing a colorant and water is excellent, a method of producing a base material for printing, and an image recorded material.

Further, an object to be achieved by a still another embodiment of the present disclosure is to provide an ink set and an image recording method which form an image that has excellent adhesiveness to a polyester base material and is recorded using an ink containing a colorant and water.

Specific means for solving the above-described problems includes the following aspects.

<1> A printing pretreatment liquid for a polyester base material, comprising: a polymer which has a Hansen solubility parameter value of 18 MPa$^{0.5}$ to 30 MPa$^{0.5}$; water; and at least one aggregating agent selected from the group consisting of a polyvalent metal salt, an organic acid, a cationic compound, and a metal complex.

<2> The printing pretreatment liquid according to <1>, in which the polymer which has a Hansen solubility parameter value of 18 MPa$^{0.5}$ to 30 MPa$^{0.5}$ contains at least one selected from a polyester resin containing an SO$_3^-$Z$^+$ group, a polyamide resin containing an SO$_3^-$Z$^+$ group, a (meth)acrylic resin containing an SO$_3^-$Z$^+$ group, or a polyester-amide copolymer containing an SO$_3^-$Z$^+$ group, in the SO$_3^-$Z$^+$ group, Z$^+$ represents a counter cation which may be bonded to or dissociated from SO$_3^-$.

<3> The printing pretreatment liquid according to <1> or <2>, in which the polymer which has a Hansen solubility parameter value of 18 MPa$^{0.5}$ to 30 MPa$^{0.5}$ contains at least one of a resin having a constitutional unit represented by Formula (I) or a resin having a constitutional unit represented by Formula (II).

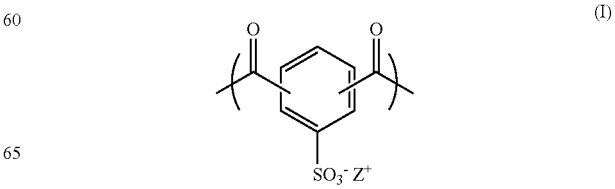

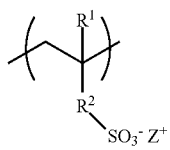

In Formula (I), $Z^+$ represents a counter cation which may be bonded to or dissociated from $SO_3^-$.

In Formula (II), $R^1$ represents a hydrogen atom or a methyl group, $R^2$ represents a single bond, an aromatic ring, or an alkylene group which may have an ester bond, an amide bond, or an oxygen atom, and $Z^+$ represents a counter cation which may be bonded to or dissociated from $SO_3^-$.

<4> The printing pretreatment liquid according to <3>, in which the resin having a constitutional unit represented by Formula (I) further has a constitutional unit represented by Formula (i).

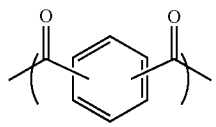

<5> The printing pretreatment liquid according to <3>, in which the resin having a constitutional unit represented by Formula (II) further has a constitutional unit represented by Formula (III).

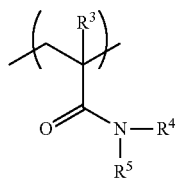

In Formula (III), $R^3$ represents a hydrogen atom or a methyl group, $R^4$ and $R^5$ each independently represent a hydrogen atom or an alkyl group which may have an oxygen atom, and $R^4$ and $R^5$ may be bonded to each other to form a ring having an oxygen atom.

<6> The printing pretreatment liquid according to <3> or <5>, in which the resin having a constitutional unit represented by Formula (II) further has a constitutional unit derived from styrene.

<7> The printing pretreatment liquid according to <3>, <5>, or <6>, in which the resin having a constitutional unit represented by Formula (II) further contains (meth)acrylic acid alkyl ester which does not contain a sulfonic acid group.

<8> The printing pretreatment liquid according to any one of <1> to <7>, in which a glass transition temperature Tg of the polymer having a Hansen solubility parameter value of 18 $MPa^{0.5}$ to 30 $MPa^{0.5}$ is in a range of 40° C. to 200° C.

<9> The printing pretreatment liquid according to any one of <1> to <8>, in which a Hansen solubility parameter value of at least one aggregating agent selected from the group consisting of a polyvalent metal salt, an organic acid, a cationic compound, and a metal complex is in a range of 25 $MPa^{0.5}$ to 40 $MPa^{0.5}$.

<10> The printing pretreatment liquid according to any one of <1> to <9>, in which a mass ratio (content A of polymer:content B of aggregating agent) of a content A of the polymer which has a Hansen solubility parameter value of 18 $MPa^{0.5}$ to 30 $MPa^{0.5}$ to a content B of at least one aggregating agent selected from the group consisting of a polyvalent metal salt, an organic acid, a cationic compound, and a metal complex is in a range of 10:1 to 1:2.

<11> A base material for printing, comprising: a polyester base material; and a treatment layer which is provided on a surface of the polyester base material and contains a solid content of the printing pretreatment liquid according to any one of <1> to <10>.

<12> A method of producing a base material for printing, comprising: a step of applying the printing pretreatment liquid according to any one of <1> to <10> to a surface of a polyester base material.

<13> An ink set comprising: an ink composition which contains a colorant and water; and the printing pretreatment liquid according to any one of <1> to <10>.

<14> An image recording method comprising: a step of applying the printing pretreatment liquid according to any one of <1> to <10> to a surface of a polyester base material; and a step of jetting an ink composition containing a colorant and water by an ink jet method onto the surface to which the printing pretreatment liquid has been applied and recording an image.

<15> An image recording method comprising: a step of jetting an ink composition containing a colorant and water by an ink jet method onto a treatment layer of a base material for printing, the treatment layer including a polyester base material and a treatment layer that is provided on a surface of the polyester base material and contains a solid content of the printing pretreatment liquid according to any one of <1> to <10>, and recording an image.

<16> An image recorded material comprising: a polyester base material; and an image which is provided on a surface of the polyester base material and contains a solid content of the printing pretreatment liquid according to any one of <1> to <10> and a colorant.

According to an embodiment of the present disclosure, it is possible to provide a printing pretreatment liquid that enhances the adhesiveness between a polyester base material and an image recorded using an ink containing a colorant and water.

Further, according to another embodiment of the present disclosure, it is possible to provide a base material for printing in which the adhesiveness of an image recorded using an ink containing a colorant and water is excellent, a method of producing a base material for printing, and an image recorded material.

Further, according to still another embodiment of the present disclosure, it is possible to provide an ink set and an image recording method which form an image that has excellent adhesiveness to a polyester base material and is recorded using an ink containing a colorant and water.

DESCRIPTION OF THE PREFERRED EMBODIMENTS

Figure 1:
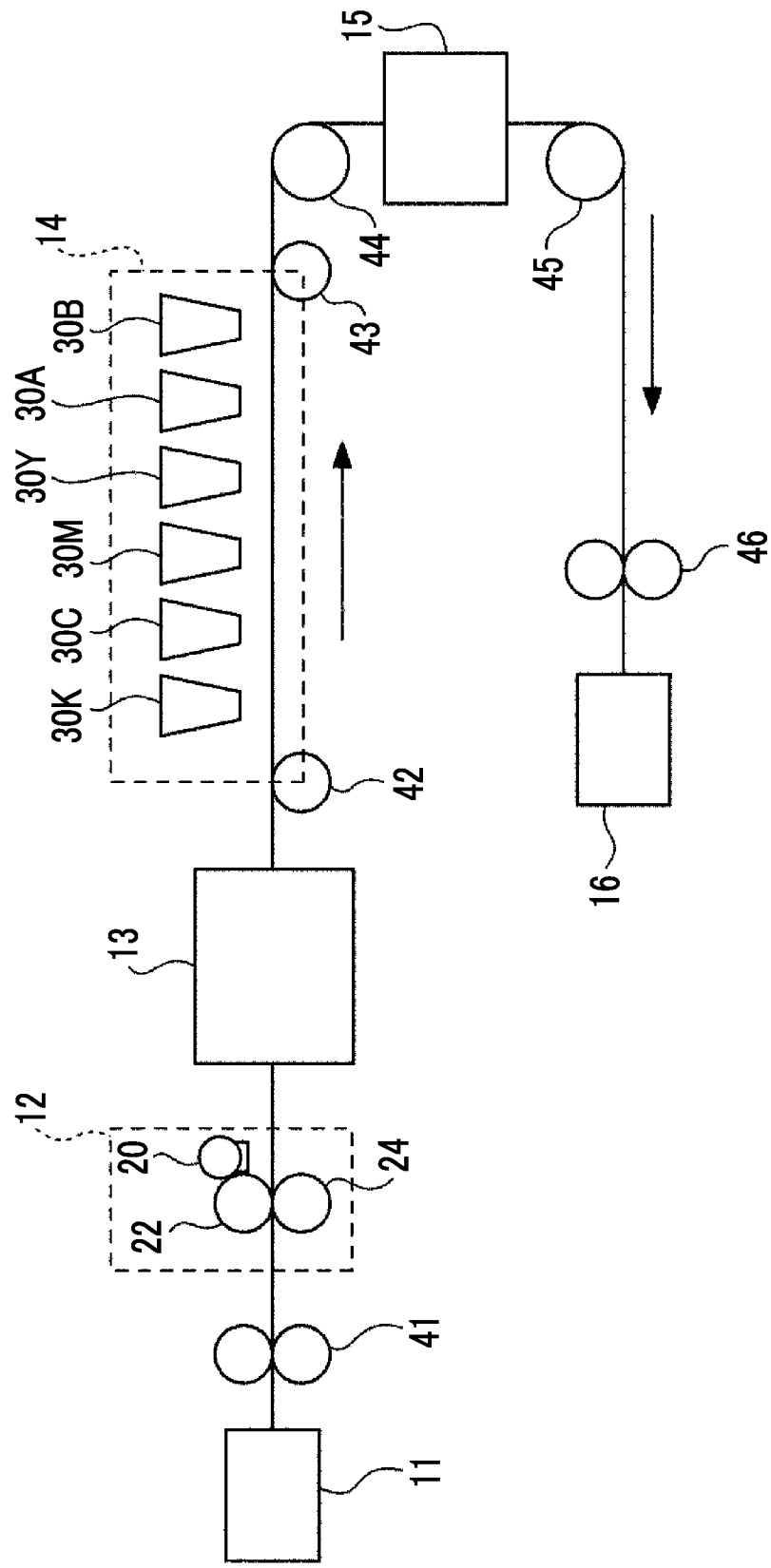
FIG. 1 is a schematic configuration view illustrating a configuration example of an image recording device used for performing an image recording method.

In the present disclosure, a numerical range shown using "to" indicates a range including the numerical values described before and after "to" as the lower limit and the upper limit. In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in a certain numerical range may be replaced with a value described in an example.

In the present disclosure, in a case where a plurality of substances corresponding to respective components in a composition are present, the amount of the respective components in the composition indicates the total amount of the plurality of substances present in the composition unless otherwise specified.

In the present disclosure, the meaning of the term "step" includes not only an independent step but also a step whose intended purpose is achieved even in a case where the step is not clearly distinguished from other steps.

In the present disclosure, "printing" indicates drawing an image of characters, patterns, or the like using an ink, and "image recording" or "recording of an image" indicates drawing an image on a polyester base material using a printing pretreatment liquid (or a treatment layer containing the solid content of the printing pretreatment liquid) and an ink and fixing the drawn image.

In the present disclosure, the term "solid content" indicates the remainder obtained by excluding water, solvents, and the like from the printing pretreatment liquid, and the amount of the solid content indicates the mass of the remainder obtained by excluding water, solvents, and the like from the printing pretreatment liquid.

In the present disclosure, ink jet printing is preferable as the printing method. In the present disclosure, "(meth)acryl" indicates at least one of acryl or methacryl, and "(meth) acrylate" indicates at least one of acrylate or methacrylate.

In the present disclosure, a combination of two or more preferable aspects is a more preferable aspect.

Printing Pretreatment Liquid

A printing pretreatment liquid according to the embodiment of the present disclosure is a printing pretreatment liquid for a polyester base material, including a polymer which has a Hansen solubility parameter value of 18 $MPa^{0.5}$ to 30 $MPa^{0.5}$, water, and at least one aggregating agent selected from the group consisting of a polyvalent metal salt, an organic acid, a cationic compound, and a metal complex.

Hereinafter, the Hansen solubility parameter value will also be referred to as an "HSP value", and the polymer having a Hansen solubility parameter value of 18 $MPa^{0.5}$ to 30 $MPa^{0.5}$ will also be referred to as a "specific polymer".

As the result of research conducted by the present inventors on the polymer contained in the printing pretreatment liquid, it was found that the adhesiveness between the polyester base material and the image recorded using an ink containing a colorant and water is improved in a case where a physical property value such as an HSP value is in a specific range (that is, in a range of 18 $MPa^{0.5}$ to 30 $MPa^{0.5}$).

Further, since the printing pretreatment liquid according to the embodiment of the present disclosure contains an aggregating agent, an image with excellent image quality can be formed by using the printing pretreatment liquid according to the embodiment of the present disclosure.

Hereinafter, each component contained in the printing pretreatment liquid according to the embodiment of the present disclosure will be described in detail.

Specific Polymer

A specific polymer indicates a polymer having an HSP value of 18 $MPa^{0.5}$ to 30 $MPa^{0.5}$.

The adhesiveness between the polyester base material and the image formed using an ink containing a colorant and water can be enhanced by using the specific polymer in the printing pretreatment liquid according to the embodiment of the present disclosure.

The specific polymer is not particularly limited as long as the HSP value is in the above-described range.

From the viewpoint of further improving the adhesiveness, the HSP value of the specific polymer is preferably in a range of 20 $MPa^{0.5}$ to 26 $MPa^{0.5}$, and more preferably in a range of 21 $MPa^{0.5}$ to 24 $MPa^{0.5}$.

Further, the form of the specific polymer in the printing pretreatment liquid is not particularly limited, the specific polymer may have a form of particles or a form of being dissolved in water, a solvent, or the like.

Examples of the specific polymer include a polyester resin, a polyamide resin, a (meth)acrylic resin, a styrene resin, a vinyl resin, a polyolefin resin, a polyurethane resin, a polycarbonate resin, a polydiene resin, an epoxy resin, a silicone resin, a cellulose resin, a chitosan resin, and copolymers obtained by combining constitutional units of these resins.

As the specific polymer, at least one selected from the group consisting of a polyester resin, a polyamide resin, a (meth)acrylic resin, and copolymers obtained by combining constitutional units of these resins is preferable.

Specific Polymer Containing Sulfonic Acid Group

As the specific polymer, a specific polymer containing a sulfonic acid group is preferable from the viewpoints that the aggregation ability is unlikely to be degraded and the adhesiveness between the polyester base material and the image formed using an ink containing a colorant and water is further enhanced in a case where an organic acid is used as an aggregating agent and from the viewpoint of excellent liquid storage stability of the prepared printing pretreatment liquid.

As the specific polymer having a sulfonic acid group, at least one selected from the group consisting of a polyester resin containing a sulfonic acid group, a polyamide resin containing a sulfonic acid group, a (meth)acrylic resin containing a sulfonic acid group, and a copolymer formed by combining constitutional units of these resins and containing a sulfuonic acid group is preferable.

As the above-described "copolymer formed by combining constitutional units of these resins and containing a sulfuonic acid group", a polyesteramide copolymer containing a sulfonic acid group is preferable.

Among these, from the viewpoint of further enhancing the adhesiveness between the polyester base material and the image formed using an ink containing a colorant and water, as the specific polymer, at least one selected from the group consisting of a polyester resin containing a sulfonic acid group (hereinafter, also referred to as a "specific polymer 1"), a polyesteramide copolymer containing a sulfonic acid group (hereinafter also referred to as a "specific polymer 2"), and a (meth)acrylic resin containing a sulfonic acid group (hereinafter also referred to as "specific polymer 3") is preferable.

Here, the sulfonic acid group of the specific polymer is represented by an $SO_3^-Z^+$ group. In the printing pretreatment liquid, $Z^+$ in the $SO_3^-Z^+$ group represents a counter cation which may be bonded to or dissociated from $SO_3^-$.

Further, in the present disclosure, the (meth)acrylic resin indicates a resin containing at least one constitutional unit derived from (meth)acrylic acid ester.

Polyester Resin Containing Sulfonic Acid Group (Specific Polymer 1)

The polyester resin containing a sulfonic acid group (specific polymer 1) may be synthesized using at least one of a polyvalent carboxylic acid compound or an alkyl ester thereof or a polyhydric alcohol compound which contains a sulfonic acid group or may be formed by introducing a sulfonic acid group into the synthesized polyester resin (for example, a polyester resin which does not contain a sulfonic acid group).

Examples of the polyvalent carboxylic acid compound containing a sulfonic acid group or an alkyl ester thereof which is used for synthesis of the specific polymer 1 include dimethyl sodium 5-sulfoisophthalate and sodium 2-sulfoterephthalate. Among these, from the viewpoint of simplicity of the method of synthesizing the polymer, dimethyl sodium 5-sulfoisophthalate is preferably used.

Meanwhile, examples of the polyhydric alcohol compound containing a sulfonic acid group include sodium benzene 1,4-dihydroxy-2-sulfonate, sodium benzene 1,3-dihydroxymethyl-5-sulfonate, and sodium 2-sulfo-1,4-butanediol.

Constitutional Unit Represented by Formula (I)

It is preferable that the specific polymer 1 has a constitutional unit represented by Formula (I).

The constitutional unit represented by Formula (I) can be introduced into the specific polymer 1 using a polyvalent carboxylic acid compound such as dimethyl sodium 5-sulfoisophthalate, sodium 5-sulfoisophthalate, dimethyl sodium 2-sulfoterephthalate, or sodium 2-sulfoterephthalate as a monomer component used for obtaining the specific polymer 1.

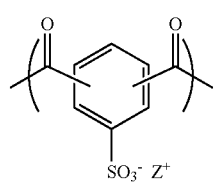

In Formula (I), $Z^+$ represents a counter cation which may be bonded to or dissociated from $SO_3^-$.

In Formula (I), it is preferable that $Z^+$ represents $Na^+$, $K^+$, or $H^+$.

The specific polymer 1 may have only one or two or more kinds of the constitutional units represented by Formula (I).

The content of the constitutional unit represented by Formula (I) in the specific polymer 1 is preferably in a range of 1% by mole to 45% by mole, more preferably in a range of 1% by mole to 25% by mole, and still more preferably in a range of 1% by mole to 15% by mole with respect to the content of all constitutional units in the specific polymer 1.

Constitutional Unit Represented by Formula (i)

It is preferable that the specific polymer 1 further has a constitutional unit represented by Formula (i).

In a case where the specific polymer 1 further has a constitutional unit represented by Formula (i), the HSP value can be easily adjusted so that the adhesiveness between the polyester base material and the image formed using an ink containing a colorant and water can be improved.

The constitutional unit represented by Formula (i) can be introduced into the specific polymer 1 using a polyvalent carboxylic acid compound such as phthalic acid, isophthalic acid, terephthalic acid, or an esterified product thereof as a monomer component used for obtaining the specific polymer 1.

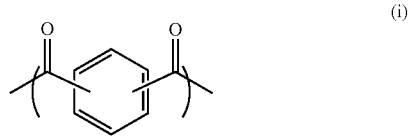

The specific polymer 1 may have only one or two or more kinds of the constitutional units represented by Formula (i).

The content of the constitutional unit represented by Formula (i) in the specific polymer 1 is preferably in a range of 5% by mole to 49% by mole, more preferably in a range of 25% by mole to 49% by mole, and still more preferably in a range of 35% by mole to 49% by mole with respect to the content of all constitutional units in the specific polymer 1.

Constitutional Unit Represented by Formula (ii)

From the viewpoints of synthetically easy introduction from a monomer component having high reactivity and imparting an emulsifying and dispersing effect, it is preferable that the specific polymer 1 has a constitutional unit represented by Formula (ii).

The constitutional unit represented by Formula (ii) can be introduced into the specific polymer 1 using a diol such as diethylene glycol or ethylene glycol as a monomer component used for obtaining the specific polymer 1.

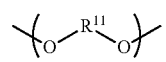

In Formula (ii), represents a divalent linking group.

As the divalent linking group, an alkylene group, an arylene group, an alkylene group having one or more ether bonds in the structure, or a group obtained by combining these is preferable.

In the present disclosure, unless otherwise specified, the "alkylene group" may be linear or branched, and some or all carbon atoms constituting the alkylene group are cyclic may be formed to have a cyclic structure.

As the alkylene group, an alkylene group having 2 to 20 carbon atoms is preferable, an alkylene group having 2 to 10 carbon atoms is more preferable, and an alkylene group having 2 to 4 carbon atoms is still more preferable.

As the arylene group, an arylene group having 6 to 20 carbon atoms is preferable, an arylene group having 6 to 10 carbon atoms is more preferable, and a phenylene group is still more preferable.

Examples of the constitutional unit represented by Formula (ii) include constitutional units derived from diols, for example, aliphatic diols such as ethylene glycol, diethylene glycol, triethylene glycol, propylene glycol, butanediol, hexanediol, and neopentyl glycol; alicyclic diols such as cyclohexanediol and hydrogenated bisphenol A; and aromatic diols such as an ethylene oxide adduct of bisphenol A and a propylene oxide adduct of bisphenol A.

The specific polymer 1 may have only one or two or more kinds of the constitutional units represented by Formula (ii).

In a case where the specific polymer 1 has the constitutional unit represented by Formula (ii), the content of the constitutional unit represented by Formula (ii) is preferably in a range of 1% by mole to 50% by mole, more preferably in a range of 10% by mole to 40% by mole, and still more preferably in a range of 10% by mole to 35% by mole with respect to the content of all constitutional units in the specific polymer 1.

Constitutional Unit Represented by Formula (iii)

From the viewpoints of improving the adhesiveness between the polyester base material and the image formed using an ink containing a colorant and water and improving the rub resistance of the image, it is preferable that the specific polymer 1 has a constitutional unit represented by Formula (iii).

The constitutional unit represented by Formula (iii) can be introduced into the specific polymer 1 using, for example, 1,4-cyclohexanedimethanol as a monomer component used for obtaining the specific polymer 1.

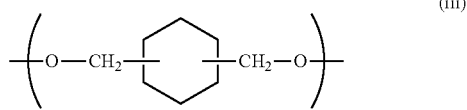

(iii)

In Formula (iii), two bonding positions of the two —$CH_2$—O— are not particularly limited, but it is preferable that the bonding positions are respectively bonded to the carbon atoms at the 1- and 4-positions or the carbon atoms at the 1- and 2-positions in the cyclohexane ring structure and more preferable that the bonding positions are respectively bonded to the carbon atoms at the 1- and 4-positions in the cyclohexane ring structure.

In a case where the specific polymer 1 has a constitutional unit represented by Formula (iii), the content of the constitutional unit represented by Formula (iii) is preferably in a range of 1% by mole to 50% by mole, more preferably in a range of 10% by mole to 40% by mole, and still more preferably in a range of 20% by mole to 40% by mole with respect to the content of all constitutional units in the specific polymer 1.

Other Constitutional Units

The specific polymer 1 may have constitutional units other than those described above.

Examples of other constitutional units include constitutional units derived from, for example, trivalent or higher valent polyvalent carboxylic acids such as trimellitic acid and an acid anhydride thereof; trivalent or higher valent polyhydric alcohol such as glycerin, trimethylolpropane, or pentaerythritol; aliphatic carboxylic acid such as naphthalenedicarboxylic acid, maleic anhydride, fumaric acid, succinic acid, alkenyl succinic anhydride, or adipic acid; and alicyclic dicarboxylic acid such as cyclohexanedicarboxylic acid.

In a case where the specific polymer 1 contains other constitutional units, the content of other constitutional units is preferably greater than 0% by mole and 49% by mole or less and more preferably greater than 0% by mole and 20% by mole or less with respect to the content of all constitutional units in the specific polymer 1.

Polyesteramide Copolymer Containing Sulfonic Acid Group (Specific Polymer 2)

The polyesteramide copolymer containing a sulfonic acid group (specific polymer 2) may be synthesized using at least one of a polyvalent carboxylic acid compound, a polyhydric alcohol compound, or a polyvalent amine compound which contains a sulfonic acid group or may be formed by introducing a sulfonic acid group into the synthesized polyesteramide copolymer (for example, a polyesteramide copolymer which does not contain a sulfonic acid group).

Since the specific polymer 2 has an amide bond, the specific polymer 2 tends to have excellent hydrolysis resistance. Therefore, in a case where the printing pretreatment liquid contains the specific polymer 2, the storage stability of the prepared printing pretreatment liquid is improved.

It is preferable that the specific polymer 2 is a polyesteramide copolymer in which some constitutional units derived from the polyhydric alcohol compound in the specific polymer 1 are replaced with constitutional units derived from the polyvalent amine compound.

It is preferable that the specific polymer 2 has a constitutional unit represented by Formula (iv) as a constitutional unit derived from a polyvalent amine compound.

The constitutional unit represented by Formula (iv) can be introduced into the specific polymer 2 using, for example, a diamine compound such as hexamethylene diamine as a monomer component used for obtaining the specific polymer 2.

The diamine compound reacts with the polyvalent carboxylic acid compound to form an amide bond.

(iv)

In Formula (iv), $R^{12}$ represents a divalent linking group.

Examples of the divalent linking group include an alkylene group, an arylene group, and a combination thereof.

As the alkylene group, an alkylene group having 1 to 20 carbon atoms is preferable, an alkylene group having 1 to 10 carbon atoms is more preferable, and an alkylene group having 1 to 8 carbon atoms is still more preferable.

As the arylene group, an arylene group having 6 to 20 carbon atoms is preferable, an arylene group having 6 to 10 carbon atoms is more preferable, and a phenylene group is still more preferable.

In Formula (iv), hydrogen atoms are respectively bonded to two nitrogen atoms, and the hydrogen atoms may be each independently substituted with a substituent. Preferred examples of the substituent include an alkyl group.

Examples of the constitutional unit represented by Formula (iv) include the following constitutional units, but the present invention is not limited thereto.

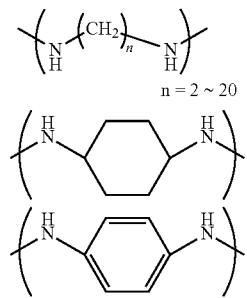

The specific polymer 2 may have only one or two or more kinds of the constitutional units represented by Formula (iv).

In a case where the specific polymer 2 has a constitutional unit represented by Formula (iv), the content of the constitutional unit represented by Formula (iv) is preferably in a range of 1% by mole to 49% by mole, more preferably in a range of 5% by mole to 20% by mole, and still more preferably in a range of 10% by mole to 15% by mole with respect to the content of all constitutional units in the specific polymer 1.

It is preferable that the specific polymer 2 has, as a constitutional unit derived from the polyvalent carboxylic acid compound, a constitutional unit represented by Formula (I) described as a constitutional unit constituting the specific polymer 1.

The preferable embodiment of the constitutional unit represented by Formula (I) which is included in the specific polymer 2 is the same as that of the constitutional unit represented by Formula (I) which is included in the specific polymer 1.

The content of the constitutional unit represented by Formula (I) in the specific polymer 2 is preferably in a range of 1% by mole to 45% by mole, more preferably in a range of 1% by mole to 25% by mole, and still more preferably in a range of 1% by mole to 15% by mole with respect to the content of all constitutional units in the specific polymer 2.

It is preferable that the specific polymer 2 has, as a constitutional unit derived from the polyvalent carboxylic acid compound, a constitutional unit represented by Formula (i) described as a constitutional unit constituting the specific polymer 1.

The preferable embodiment of the constitutional unit represented by Formula (i) which is included in the specific polymer 2 is the same as that of the constitutional unit represented by Formula (i) which is included in the specific polymer 1.

The content of the constitutional unit represented by Formula (i) in the specific polymer 2 is preferably in a range of 5% by mole to 49% by mole, more preferably in a range of 25% by mole to 49% by mole, and still more preferably in a range of 35% by mole to 49% by mole with respect to the content of all constitutional units in the specific polymer 2.

It is preferable that the specific polymer 2 has, as a constitutional unit derived from the polyhydric alcohol compound, a constitutional unit represented by Formula (ii) described as a constitutional unit constituting the specific polymer 1.

The preferable embodiment of the constitutional unit represented by Formula (ii) which is included in the specific polymer 2 is the same as that of the constitutional unit represented by Formula (ii) which is included in the specific polymer 1.

In a case where the specific polymer 2 has a constitutional unit represented by Formula (ii), the content of the constitutional unit represented by Formula (ii) is preferably in a range of 1% by mole to 30% by mole, more preferably in a range of 5% by mole to 25% by mole, and still more preferably in a range of 10% by mole to 20% by mole with respect to the content of all constitutional units in the specific polymer 2.

It is preferable that the specific polymer 2 has, as a constitutional unit derived from the polyhydric alcohol compound, a constitutional unit represented by Formula (iii) described as a constitutional unit constituting the specific polymer 1.

The preferable embodiment of the constitutional unit represented by Formula (iii) which is included in the specific polymer 2 is the same as that of the constitutional unit represented by Formula (iii) which is included in the specific polymer 1.

In a case where the specific polymer 2 has a constitutional unit represented by Formula (iii), the content of the constitutional unit represented by Formula (iii) is preferably in a range of 1% by mole to 40% by mole, more preferably in a range of 5% by mole to 35% by mole, and still more preferably in a range of 10% by mole to 30% by mole with respect to the content of all constitutional units in the specific polymer 2.

The specific polymer 2 may further have constitutional units other than those described above. As other constitutional units, other constitutional units described as the constitutional units constituting the specific polymer 1 are preferable.

In a case where the specific polymer 2 has other constitutional units, the content of other constitutional units is preferably greater than 0% by mole and 49% by mole or less and more preferably greater than 0% by mole and 20% by mole or less with respect to the content of all constitutional units in the specific polymer 2.

(Meth)Acrylic Resin Containing Sulfonic Acid Group (Specific Polymer 3)

The (meth)acrylic resin containing a sulfonic acid group (specific polymer 3) may be synthesized using (meth)acrylic acid ester containing a sulfonic acid group or a monomer component containing (meth)acrylic acid ester that does not contain a sulfonic acid group and a sulfonic acid group which is copolymerized with (meth)acrylic acid ester or may be formed by introducing a sulfonic acid group into the synthesized (meth)acrylic resin (for example, a (meth)acrylic resin that does not contain a sulfonic acid group).

Examples of the (meth)acrylic acid ester containing a sulfonic acid group include 2-sulfoethyl (meth)acrylate, 3-sulfopropyl (meth)acrylate, methacryloyloxyethylsulfonic acid, and salts thereof.

Further, examples of the monomer component containing a sulfonic acid group which can be copolymerized with the (meth)acrylic acid ester includes 2-acrylamido-2-methylpropanesulfonic acid, acrylamido-2-methylpropanesulfonic acid, vinylsulfonic acid, allylsulfonic acid, styrenesulfonic acid, α-methylstyrenesulfonic acid, vinylbenzyl sulfonic acid, 1-allyloxy-2-hydroxypropanesulfonic acid, allyloxypolyethylene glycol (degree of polymerization of ethylene glycol portion: 10) sulfonic acid, and salts thereof.

Further, as the counter ion constituting the salt, a sodium ion, a potassium ion, or the like is preferable.

Constitutional Unit Represented by Formula (II)

It is preferable that the specific polymer 3 has a constitutional unit represented by Formula (II).

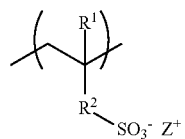

(II)

In Formula (II), $R^1$ represents a hydrogen atom or a methyl group, $R^2$ represents a single bond, an aromatic ring, or an alkylene group which may have an ester bond, an amide bond, or an oxygen atom, and $Z^+$ represents a counter cation which may be bonded to or dissociated from $SO_3^-$.

$R^2$ represents preferably an aromatic ring or an alkylene group having an amide bond and 1 to 6 carbon atoms, more preferably an alkylene group having an amide bond and 1 to 6 carbon atoms, and still more preferably an alkylene group having an amide bond and 1 to 4 carbon atoms.

Further, the alkylene group may be further substituted with an alkyl group, a hydroxy group, or the like.

More specifically, as the constitutional unit represented by Formula (II), a constitutional unit derived from 2-acrylamido-2-methylpropanesulfonic acid, vinylsulfonic acid, allylsulfonic acid, styrenesulfonic acid, or 1-allyloxy-2-hydroxypropanesulfonic acid is preferable, and a constitutional unit derived from 2-acrylamido-2-methylpropanesulfonic acid or styrenesulfonic acid is more preferable from the viewpoint of simplicity of the polymer synthesis method.

The specific polymer 3 may have only one or two or more kinds of the constitutional units represented by Formula (ii).

The content of the constitutional unit represented by Formula (II) in the specific polymer 3 is preferably in a range of 1% by mole to 40% by mole, more preferably in a range of 2% by mole to 30% by mole, and still more preferably in a range of 3% by mole to 15% by mole with respect to the content of all constitutional units in the specific polymer 3.

Constitutional Units Represented by Formula (III)

From the viewpoint of adjusting the HSP value, it is preferable that the specific polymer 3 has a constitutional unit represented by Formula (III).

The constitutional unit represented by Formula (III) can be introduced into the specific polymer 3 by using, for example, (meth)acrylamide or 4-(meth)acryloylmorpholine as a monomer component used for obtaining the specific polymer 3.

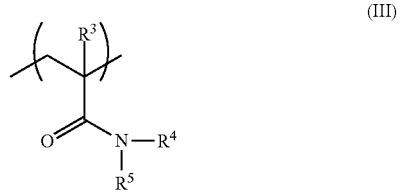

(III)

In Formula (III), $R^3$ represents a hydrogen atom or a methyl group, $R^4$ and $R^5$ each independently represent a hydrogen atom or an alkyl group which may have an oxygen atom, and $R^4$ and $R^5$ may be bonded to each other to form a ring having an oxygen atom.

Further, the alkyl group represented by $R^4$ and $R^5$ may be further substituted with an alkyl group, a hydroxy group, or an acetyl group.

More specifically, as the constitutional unit represented by Formula (III), a constitutional unit derived from (meth) acrylamide, 4-(meth)acryloylmorpholine, 2-hydroxyethyl (meth)acrylamide, diacetone (meth)acrylamide, N-butoxy methyl (meth)acrylamide, N-i sopropyl (meth)acrylamide, N, N-dimethyl (meth)acrylamide, N,N-diethyl (meth)acrylamide, or dimethylaminopropyl (meth)acrylamide is preferable, and a constitutional unit derived from at least one selected from the group consisting of (meth)acrylamide, 4-acryloylmorpholine, and 2-hydroxyethyl (meth)acrylamide is more preferable from the viewpoint of simplicity of the polymer synthesis method.

The specific polymer 3 may have only one or two or more kinds of the constitutional units represented by Formula (III).

The content of the constitutional unit represented by Formula (III) in the specific polymer 3 is preferably in a range of 0% by mole to 80% by mole, more preferably in a range of 10% by mole to 70% by mole, and still more preferably in a range of 30% by mole to 65% by mole with respect to the content of all constitutional units in the specific polymer 3.

Constitutional Units Derived from (Meth)Acrylic Acid Ester that does not Contain Sulfonic Acid Group The specific polymer 3 may have a constitutional unit derived from (meth)acrylic acid ester that does not contain a sulfonic acid group.

Examples of the (meth)acrylic acid ester that does not contain a sulfonic acid group include (meth)acrylic acid alkyl ester that contains an alkyl group having 1 to 24 carbon atoms; hydroxy group-containing (meth)acrylate such as 2-hydroxyethyl (meth)acrylate, 2-hydroxypropyl (meth) acrylate, 2-hydroxybutyl (meth)acrylate, 4-hydroxybutyl (meth)acrylate, or glycerin mono(meth)acrylate; nitrogen atom-containing (meth)acrylate such as dimethylaminoethyl (meth)acrylate, or 2-morpholinoethyl (meth)acrylate; and (meth)acrylate having an ether bond such as methoxyethyl (meth)acrylate, 3-methoxybutyl (meth)acrylate, methoxydipropylene glycol (meth)acrylate, methoxytripropylene glycol (meth)acrylate, methoxy polyethylene glycol (meth) acrylate, or phenoxyethyl (meth)acrylate.

Among these, from the viewpoint of adjusting the glass transition temperature (Tg) of the specific polymer 3, (meth) acrylic acid alkyl ester that does not contain a sulfonic acid group is preferable as (meth)acrylic acid ester that does not contain a sulfonic acid group.

The alkyl group in the (meth)acrylic acid alkyl ester has preferably 1 to 20 carbon atoms, more preferably 2 to 18 carbon atoms, and still more preferably 4 to 12 carbon atoms.

In the specific polymer 3, the content of the constitutional unit derived from the (meth)acrylic acid ester that does not contain a sulfonic acid group is preferably in a range of 0% by mole to 80% by mole, more preferably in a range of 10% by mole to 70% by mole, and still more preferably in a range of 20% by mole to 65% by mole with respect to the content of all constitutional units in the specific polymer 3.

Other Constitutional Units

The specific polymer 3 may have constitutional units other than those described above.

Examples of other constitutional units include a constitutional unit derived from a vinyl monomer such as styrene or α-methylstyrene and a constitutional unis derived from (meth)acrylic acid and a salt thereof.

It is preferable that the specific polymer 3 has a constitutional unit derived from styrene from the viewpoint of simplicity of the polymer synthesis method.

The content of the constitutional unit represented by Formula (III) in the constitutional unit derived from styrene is preferably in a range of 10% by mole to 50% by mole, more preferably in a range of 15% by mole to 45% by mole, and still more preferably in a range of 15% by mole to 35% by mole with respect to the content of all constitutional units in the specific polymer 3.

Physical Properties of Specific Polymer

From the viewpoints of suppressing peeling of the image recorded using an ink containing a colorant and water and easiness of taking out viscosity in a taking-out step in a method of producing a polymer, the weight-average molecular weight of the specific polymer is preferably in a range of 1000 to 500000, more preferably in a range of 2000 to 250000, and still more preferably in a range of 3000 to 200000.

In the present disclosure, the weight-average molecular weight (Mw) indicates a value measured according to gel permeation chromatography (GPC) unless otherwise specified.

The measuring apparatus and the measurement conditions are basically based on the following conditions, but an appropriate carrier (eluent) and a column suitable for the carrier may be selected depending on the kind of the polymer and used.

Other items will refer to JIS K 7252-1 to 4: 2008.

In addition, an insoluble polymer will be measured at a soluble concentration under the following conditions.

Conditions

Column: Two of TOSOH TSKgel Super AWM-H (trade name) are connected
Carrier: 10 mM LiBr/N-methylpyrrolidone
Measurement temperature: 40° C.
Carrier flow rate: 1.0 ml/min
Sample concentration: 0.1% by mass
Detector: refractive index (RI) detector
Injection volume: 0.1 ml The glass transition temperature (Tg) of the specific polymer is preferably 30° C. or higher, more preferably in a range of 40° C. to 200° C., and still more preferably in a range of 40° C. to 180° C.

In the present disclosure, the glass transition temperature of each resin containing the specific polymer can be measured using differential scanning calorimetry (DSC).

Specific measurement is performed in conformity with the method described in JIS K 7121 (1987) or JIS K 6240 (2011). As the glass transition temperature in the present specification, the extrapolated glass transition starting temperature (hereinafter, also referred to as the Tig) is used.

The method of measuring the glass transition temperature will be described in more detail.

In a case where the glass transition temperature is acquired, the resin is maintained at a temperature lower than the expected Tg of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition starting temperature (Tig), that is, the glass transition temperature Tg in the present specification is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

Further, it is preferable that the specific polymer is a water-soluble polymer or a water-dispersible polymer.

In the present disclosure, the term "water-soluble" indicates a property in which a substance can be dissolved in water at a certain concentration or higher. It is preferable that the term "water-soluble" indicates a property in which 5 g or greater (more preferably 10 g or greater) of a substance is dissolved in 100 g of water at 25° C.

In the present disclosure, the term "water-dispersible" indicates a state in which a compound that is not water-soluble is not precipitated in water at 25° C. More specifically, the term "water-dispersible" indicates a state in which a compound that is not water-soluble forms a micelle in water or a state in which the compound is uniformly dispersed in water.

The specific polymer may be in any form of a linear polymer, a graft polymer, a star polymer, or a network polymer, but a form of a linear polymer is preferable.

Specific Examples

Hereinafter, specific examples of the specific polymer will be described, but the present invention is not limited thereto.

In addition, in the following specific examples, the subscript outside the parentheses of each constitutional unit indicates the molar content.

In the following specific examples, —SO₃Na may be —SO₃K or 1—SO₃H, or may be —SO₃⁻ after dissociation.

P-1

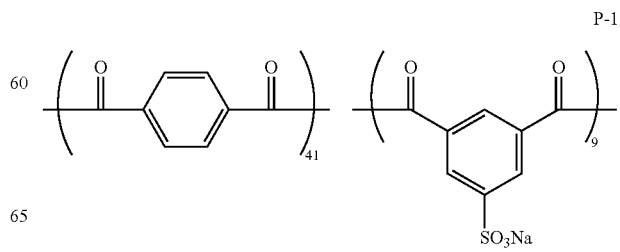

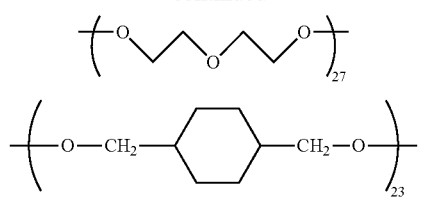
P-2
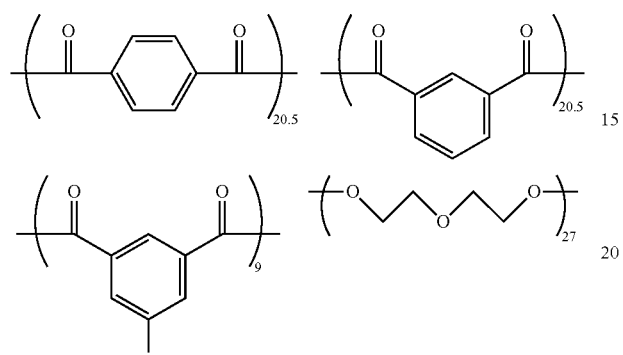
P-3
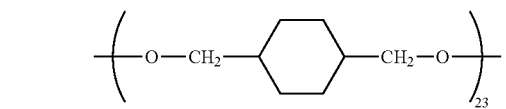
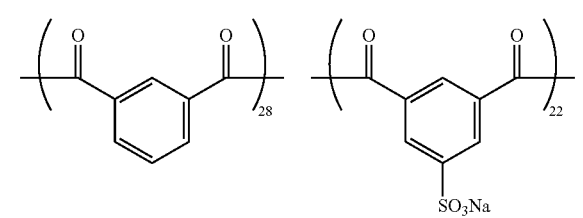
P-4
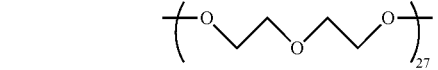
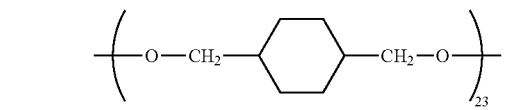
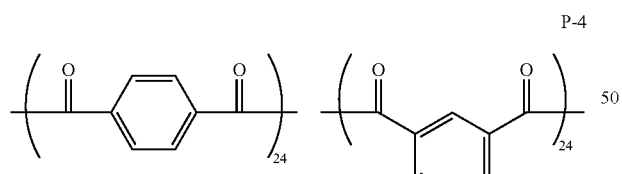
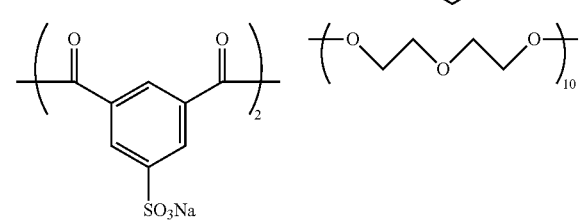
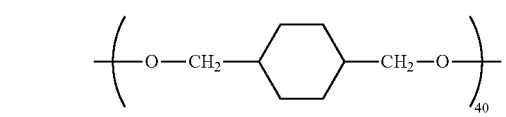
P-5
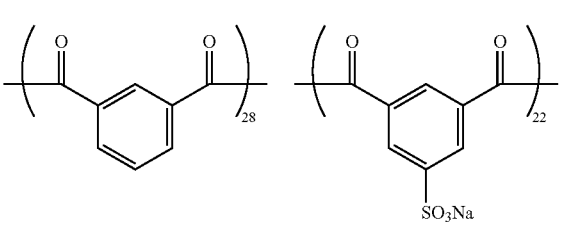
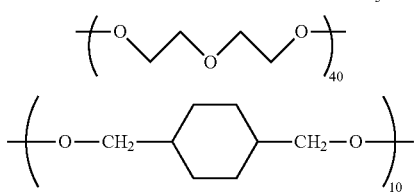
P-6
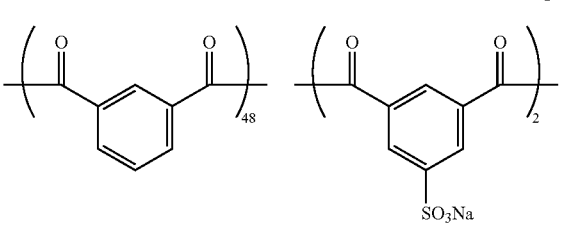
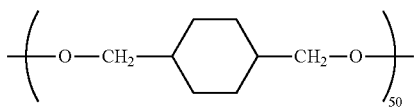
P-7
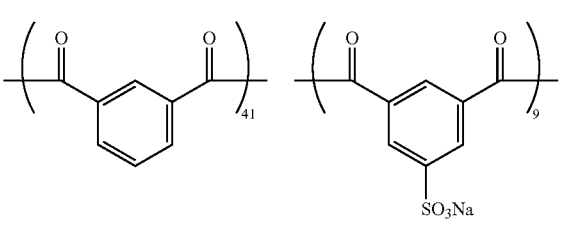
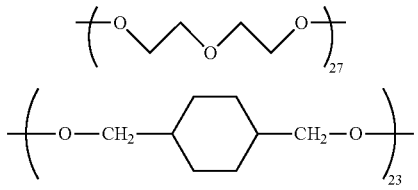
P-8
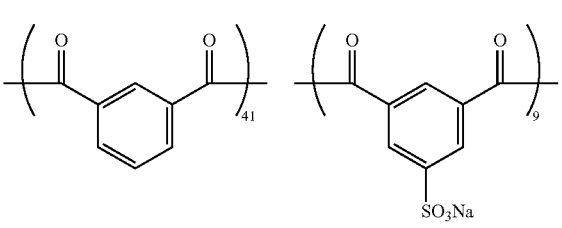
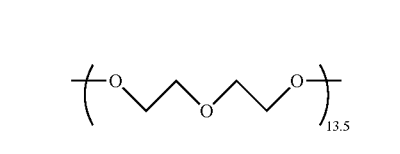

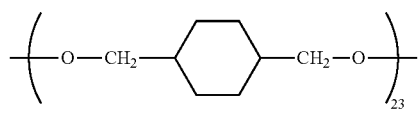
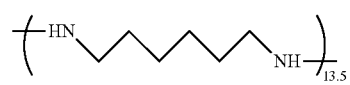
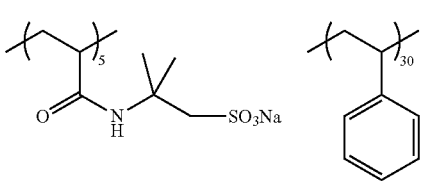
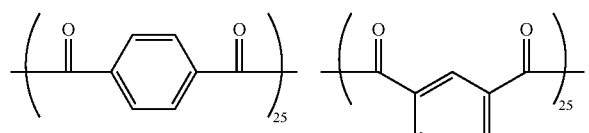
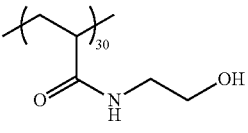
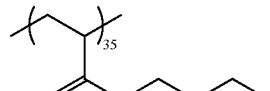
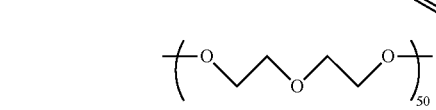
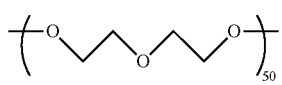
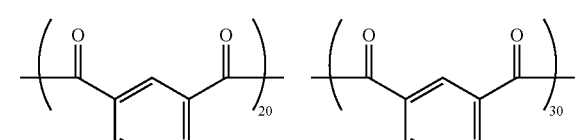
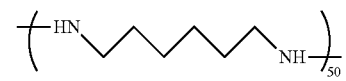

Calculation of HSP Value

In the present disclosure, the value of Total calculated using HSPiP software (https://www.pirika.com/JP/HSP/index.html) is defined as the "HSP value".

A specific method of calculating the HSP value is as follows.

First, after converting the structural formula into the Smiles notation using structural formula editor software (ChemBioDraw Ultra 13.0), the value of Total is calculated by Y-MB of HSPiP (HSPiP 4th edition 4.1.07).

Next, a method of calculating the HSP value of the polymer will be described in detail.

The HSP value of the polymer is calculated by calculating the HSP value of each constitutional unit constituting the polymer and adding the obtained HSP value of each constitutional unit according to each mole fraction.

Hereinafter, a specific calculation method will be described.

First, as listed in Tables 1 to 3, each constitutional unit is converted into a structural formula for calculating the HSP value according to the structure of the polymer.

Subsequently, using the structural formula editor software (ChemBioDraw Ultra 13.0), the structural formula for calculating the HSP value is converted into the Smiles notation, and the bonding point "*" is rewritten as "X" in the obtained Smiles notation, and From the Smiles notation, the value of Total (that is, the HSP value in the present disclosure) is calculated from the Y-MB of HSPiP (HSPiP 4th edition 4.1.07) based on the rewritten Smiles notation.

Thereafter, the obtained HSP value of each constitutional unit (listed in Tables 1 to 3) is added according to each mole fraction to calculate the HSP values of all polymers.

TABLE 1

| Constitutional unit of polyester resin or polyamide resin | Structural formula for calculating HSP value | Smiles notation | HSP value (MPa$^{0.5}$) |
|---|---|---|---|
| IPA (meta-dicarbonyl benzene) | meta-benzoate ester | O=C(OX)C1=CC=CC(X)=C1 | 22.4 |
| IPA (meta-dicarbonyl benzene) | meta-benzamide (NH) | O=C(NX)C1=CC=CC(X)=C1 | 28.6 |
| TPA (para-dicarbonyl benzene) | para-benzoate ester | O=C(OX)C1=CC=C(X)C=C1 | 23.3 |
| SSIPA (meta-dicarbonyl benzene with SO$_3$Na) | benzoate ester with SO$_3$Na | O=C(OX)C1=CC(S(=O)(O[H])=O)=CC(X)=C1 (Since Na is not recognized, Na is calculated by H) | 35.5 |
| SSIPA (meta-dicarbonyl benzene with SO$_3$Na) | benzamide with SO$_3$Na | O=C(NX)C1=CC(S(=O)(O[H])=O)=CC(X)=C1 (Since Na is not recognized, Na is calculated by H) | 42.0 |

TABLE 2

| Constitutional unit of polyester resin or polyamide resin | Structural formula for calculating HSP value | Smiles notation | HSP value (MPa$^{0.5}$) |
|---|---|---|---|
| DEG (–O–CH$_2$CH$_2$–O–CH$_2$CH$_2$–O–) | *–CH$_2$CH$_2$–O–CH$_2$CH$_2$–O–C(=O)–* | XCCOCCOC(X)=O | 20.1 |
| CHDM (–O–CH$_2$–cyclohexyl–CH$_2$–O–) | *–CH$_2$–cyclohexyl–CH$_2$–O–C(=O)–* | XCC1CCC(COC(X)=O)CC1 | 18.8 |

TABLE 2-continued

| Constitutional unit of polyester resin or polyamide resin | Structural formula for calculating HSP value | Smiles notation | HSP value (MPa$^{0.5}$) |
|---|---|---|---|
| 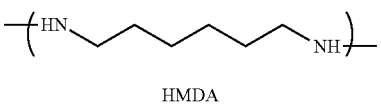<br>HMDA | 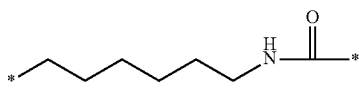 [SMILES: *CCCCCCNC(*)=O] | O=C(X)NCCCCCCX | 22.5 |

TABLE 3

| Constitutional unit of (meth)acrylic resin | Structural formula for calculating HSP value | Smiles notation | HSP value (MPa$^{0.5}$) |
|---|---|---|---|
| 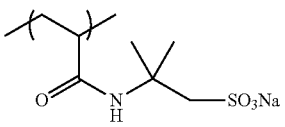<br>AMPS | 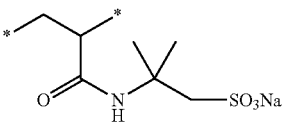 | XC(C(NC(C)(C)CS(=O)(O[Na])=O)=O)CX | 25.0 |
| 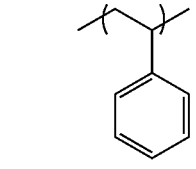<br>St | 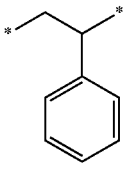 | XC(C1=CC=CC=C1)CX | 18.9 |
| 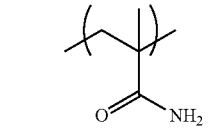<br>MAAm | 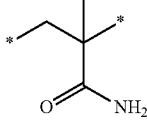 | XCC(C)(C(N)=O)X | 23.7 |
| 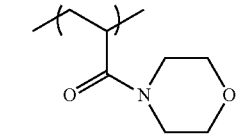<br>ACMO | 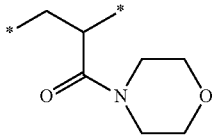 [SMILES: *CC(*)C(=O)N1CCOCC1] | XCC(C(N1CCOCC1)=O)X | 24.6 |
| 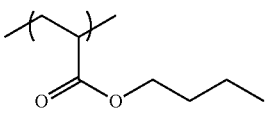<br>BA | 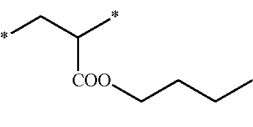 | XCC(C(OCOCC)=O)X | 17.5 |
| 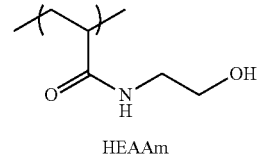<br>HEAAm | 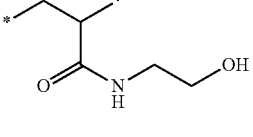 | XCC(C(NCCO)=O)X | 33.5 |

In a case of the polymer P-1 with the following structure, for example, the calculation is performed as follows from the HSP value of each constitutional unit listed in Table 1.

Further, the HSP value is set as a value acquired by rounding off the second digit after the decimal point to one digit after the decimal point.

Constitutional unit TPA derived from dimethyl terephthalate (23.3×0.41)+constitutional unit SSIPA derived from dimethyl sodium 5-sulfoisophthalate (35.5×0.09)+constitutional unit DEG derived from diethylene glycol (20.1×0.27)+constitutional unit CHDM derived from cyclohexanedimethanol (18.8×0.23)=22.5 [$MPa^{1/2}$]

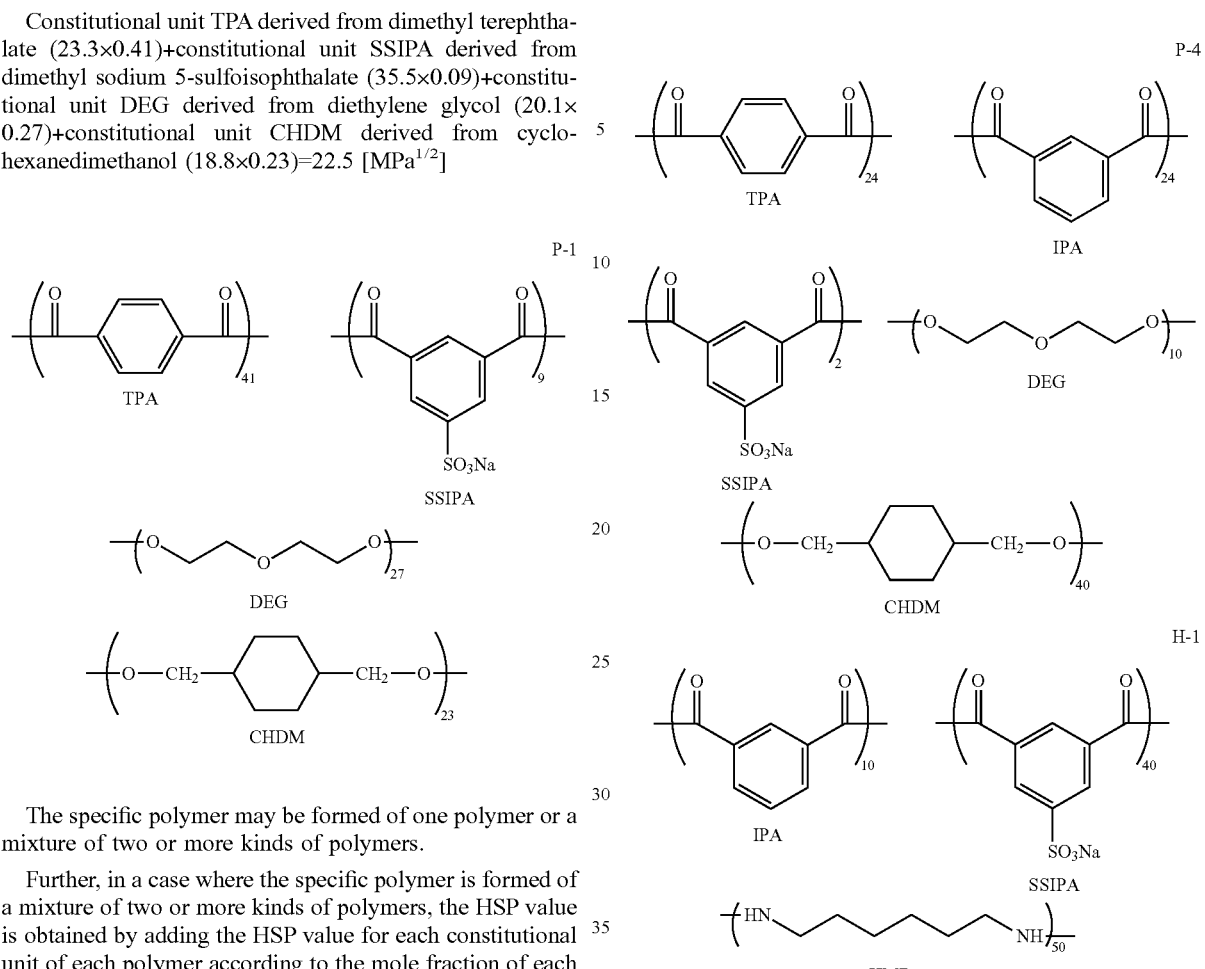

The specific polymer may be formed of one polymer or a mixture of two or more kinds of polymers.

Further, in a case where the specific polymer is formed of a mixture of two or more kinds of polymers, the HSP value is obtained by adding the HSP value for each constitutional unit of each polymer according to the mole fraction of each constitutional unit and calculating the HSP values of all polymers.

For example, in a case where polymers P-4 and H-1 with the following structures are set such that the total mole of each constitutional unit of the polymer P-4 is set as X and the total mole of each constitutional unit of the polymer H-1 is set as Y, the equation of "{(23.3×0.24)+(22.4×0.24)+(35.5×0.02)+(20.1×0.10)+(18.8×0.40)}×0.8+{(28.6 x 0.1)+(42.0×0.4)+(22.5×0.5)}×0.2=23.1" is satisfied in a case where the polymer P-4 and the polymer H-1 are mixed at a molar ratio (X:Y) of 80:20.

As described above, in a case where the HSP value of the entire mixture is in a range of 18 $MPa^{0.5}$ to 30 $MPa^{0.5}$, the adhesiveness between the polyester base material and the image recorded using an ink containing a colorant and water can be obtained even in a case where the HSP value of some or all the polymers to be mixed is out of the range of 18 $MPa^{0.5}$ to 30 $MPa^{0.5}$.

That is, in a case where the HSP value of the entire polymer mixture satisfies the range of 18 $MPa^{0.5}$ to 30 $MPa^{0.5}$, the printing pretreatment liquid according to the embodiment of the present disclosure may contain a polymer having an HSP value of 18 $MPa^{0.5}$ to 30 $MPa^{0.5}$.

However, it is preferable that the HSP value of all the polymers to be mixed is in the range of 18 $MPa^{0.5}$ to 30 $MPa^{0.5}$ from the viewpoint of improving the adhesiveness between the polyester base material and the image formed using an ink containing a colorant and water.

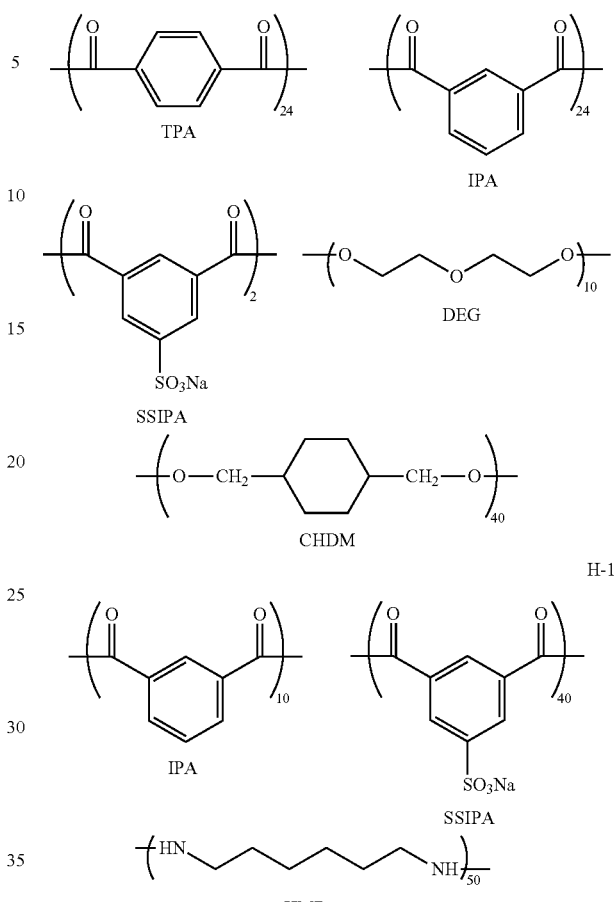

Content

From the viewpoint of enhancing the adhesiveness between the polyester base material and the image formed using an ink containing a colorant and water, the content of the specific polymer in the printing pretreatment liquid according to the embodiment of the present disclosure is preferably in a range of 1% by mass to 25% by mass, more preferably in a range of 3% by mass to 15% by mass, and still more preferably in a range of 5% by mass to 10% by mass with respect to the total mass of the printing pretreatment liquid.

Water

The printing pretreatment liquid according to the embodiment of the present disclosure contains water.

The content of water is preferably in a range of 50% by mass to 95% by mass, more preferably in a range of 60% by mass to 90% by mass, and still more preferably in a range of 70% by mass to 85% by mass with respect to the total mass of the printing pretreatment liquid.

Aggregating Agent

The printing pretreatment liquid according to the embodiment of the present disclosure further contains at least one aggregating agent selected from the group consisting of a polyvalent metal salt, an organic acid, a cationic compound, and a metal complex.

Each component will be described below in detail.

In a case where the printing pretreatment liquid contains an aggregating agent, the aggregating agent is combined with the ink containing a colorant and water, and an image having excellent image quality is easily obtained.

Further, it is considered that the leakage of the aggregating agent in the obtained printed material is suppressed and the transfer of components contained in the printing pretreatment liquid such as the aggregating agent suppressed by combining the specific polymer and the aggregating agent. The mechanism by which the transfer is suppressed is not clear, but it is assumed that the transfer is suppressed because the affinity between the specific polymer and the aggregating agent is high and particularly the transfer of the aggregating agent is suppressed.

In the printing pretreatment liquid according to the embodiment of the present disclosure, from the viewpoints of improving the image quality of the obtained printed material and suppressing the transfer of the components contained in the printing pretreatment liquid, the mass ratio between a content A of the specific polymer and a content B of the aggregating agent (content A of specific polymer: content B of aggregating agent) in the printing pretreatment liquid is preferably in a range of 100:4 to 1:3, more preferably in a range of 100:6 to 1:2.5, and still more preferably in a range of 10:1 to 1:2.

From the viewpoints of improving the image quality of the obtained printed material and the rub resistance of the image, it is preferable that the aggregating agent contains an organic acid and more preferable that the aggregating agent contains a dicarboxylic acid as the organic acid.

Hereinafter, the aggregating agent used in the printing pretreatment liquid according to the embodiment of the present disclosure will be described in detail.

Organic Acid

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group. From the viewpoint of the aggregation rate of the ink, a phosphoric acid group or a carboxy group is preferable, and a carboxy group is more preferable as the acidic group.

Further, it is preferable that at least a part of the acidic group is dissociated in the printing pretreatment liquid.

Preferred examples of the organic compound containing a carboxy group suitable as the organic acid include polyacrylic acid, acetic acid, glycolic acid, malonic acid, malic acid (preferably DL-malic acid), maleic acid, ascorbic acid, succinic acid, glutaric acid, fumaric acid, citric acid, tartaric acid, phthalic acid, 4-methylphthalic acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumarinic acid, thiophene carboxylic acid, nicotinic acid, derivatives of these compounds, and salts thereof. These compounds may be used alone or in combination of two or more kinds thereof.

From the viewpoint of the aggregation rate of the ink, as the organic compound containing a carboxy group, divalent or higher valent carboxylic acid (hereinafter, also referred to as polyvalent carboxylic acid) is preferable, dicarboxylic acid or tricarboxylic acid is more preferable, and dicarboxylic acid is still more preferable.

As the dicarboxylic acid and the tricarboxylic acid, malonic acid, malic acid, maleic acid, succinic acid, glutaric acid, fumaric acid, tartaric acid, 4-methylphthalic acid, or citric acid is preferable, and malonic acid, malic acid, glutaric acid, tartaric acid, or citric acid is more preferable.

It is preferable that the organic acid has a low pKa (for example, in a range of 1.0 to 5.0).

By bringing an organic acid with a low pKa into contact with particles such as polymer particles or pigments in an ink that are stably dispersed in a weakly acidic functional group such as a carboxy group, the surface charge of the particles can be reduced. As a result, since the dispersion stability of the particles can be lowered, an organic acid with a low pKa is preferable as the aggregating agent.

As the organic acid contained in the printing pretreatment liquid, a divalent or higher valent organic acid which has a low pKa and a high solubility in water is preferable, and a divalent or trivalent organic acid which has a high buffer capacity in a pH region where the pKa is lower than the pKa of the functional group (for example, a carboxy group) in which the particles are stably dispersed in the ink is more preferable.

In a case where an organic acid is used as the aggregating agent, the content of the organic acid is preferably in a range of 1% by mass to 20% by mass, more preferably in a range of 2% by mass to 15% by mass, and still more preferably in a range of 5% by mass to 10% by mass with respect to the total mass of the printing pretreatment liquid according to the embodiment of the present disclosure.

Polyvalent Metal Salt

The polyvalent metal salt is formed of a di- or higher polyvalent metal ion and an anion that is bonded to the polyvalent metal ion. Further, it is preferable that the polyvalent metal salt is water-soluble.

Specific examples of the polyvalent metal ion include divalent metal ions such as $Ca^{2+}$, $Cu^{2+}$, $Ni^{2+}$, $Mg^{2+}$, $Zn^{2+}$, and $Ba^{2+}$; and trivalent metal ions such as $Al^{3+}$, $Fe^{3+}$, and $Cr^{3+}$. Examples of the anion include $Cl^-$, $NO_3^-$, $I^-$, $Br^-$, $ClO_3^-$, $SO_4^{2-}$, and a carboxylate ion.

The polyvalent metal ions and the anions described above can be optionally combined.

As the polyvalent metal salt, a salt containing $Ca^{2+}$ or $Mg^{2+}$ is preferable from the viewpoint of improving the image quality of the obtained printed material.

As the polyvalent metal salt, a salt of a sulfate ion $(SO_4^{2-})$, a nitrate ion $(NO_3^-)$, or a carboxylate ion ($RCOO^-$, R represents an alkyl group having 1 or more carbon atoms) is preferable.

Here, it is preferable that the carboxylate ion is derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid.

Preferred examples of the polyvalent metal salt include a calcium salt or a magnesium salt of sulfuric acid, and other examples thereof include a calcium salt or a magnesium salt of monocarboxylic acid such as formic acid or acetic acid, a calcium salt or a magnesium salt of nitric acid, calcium chloride, and magnesium chloride.

In a case where a polyvalent metal salt is used as the aggregating agent, the content of the polyvalent metal salt is preferably in a range of 1% by mass to 40% by mass, more preferably in a range of 2% by mass to 25% by mass, and still more preferably in a range of 5% by mass to 20% by mass with respect to the total mass of the printing pretreatment liquid according to the embodiment of the present disclosure.

Cationic Compound

As the cationic compound, for example, a primary, secondary, or tertiary amine salt type compound is preferable. Examples of the amine salt type compound include a compound such as a hydrochloride or an acetate (such as laurylamine, cocoamine, stearylamine, or rosinamine), a quaternary ammonium salt type compound (such as lauryltrimethylammonium chloride, cetyltrimethylammonium chloride, lauryldimethylbenzyl ammonium chloride, benzyltributylammonium chloride, or benzalkonium chloride), a pyridinium salt type compound (such as cetylpyridinium chloride or cetylpyridinium bromide), an imidazoline type cationic compound (such as 2-heptadecenyl-hydroxyethyl-imidazoline), and an ethylene oxide adduct of a higher alkylamine (such as dihydroxyethylstearylamine). In addition, polyallylamines (that is, polyallylamine or polyallylamine derivatives) may be used as the amine salt type compound.

The polyallylamine or the polyallylamine derivatives are not particularly limited and can be appropriately selected from known ones, and examples thereof include a polyallylamine hydrochloride, a polyallylamine amide sulfate, an allylamine hydrochloride-diallylamine hydrochloride copolymer, an allylamine acetate-diallyl amine acetate copolymer, an allylamine acetate-diallylamine acetate copolymer, an allylamine hydrochloride-dimethylallylamine hydrochloride copolymer, an allylamine-dimethylallylamine copolymer, a polydiallylamine hydrochloride, a polymethyldiallylamine hydrochloride, a polymethyldiallylamine amide sulfate, a polymethyldiallylamine acetate, a polydiallyldimethylammonium chloride, a diallylamine acetate-sulfur dioxide copolymer, a diallylmethylethylammonium ethyl sulfate-sulfur dioxide copolymer, a methyl diallyl amine hydrochloride-sulfur dioxide copolymer, a diallyldimethylammonium chloride-sulfur dioxide copolymer, and a diallyldimethylammonium chloride-acrylamide copolymer.

As such a polyallylamine or a polyallylamine derivative, commercially available products can be used, and example thereof include "PAA-HCL-01", "PAA-HCL-03", "PAA-HCL-05", "PAA-HCL-3L", "PAA-HCL-10L", "PAA-H-HCL", "PAA- SA", "PAA-01", "PAA-03", "PAA-05", "PAA-08", "PAA-15", "PAA-15C", "PAA-25", "PAA-H-10C", "PAA-D11-HCL", "PAA-D41-HCL", "PAA-D19-HCL", "PAS-21CL", "PAS-M-1L", "PAS-M-1", "PAS-22SA", "PAS-M-1A", "PAS-H-1L", "PAS-H-5L", "PAS-H-10L", "PAS-92", "PAS-92A", "PAS-J-81L", and "PAS-J-81" (all trade names, Nittobo Medical Co., Ltd.); and "HIMO Neo-600", "HIMOLOC Q-101", "HIMOLOC Q-311", "HIMOLOC Q-501", "HIMAX SC-505", and "HIMAX SC-505"(all trade names, manufactured by Hymo Corporation).

In a case where a cationic compound is used as the aggregating agent, the content of the cationic compound is preferably in a range of 1% by mass to 40% by mass, more preferably in a range of 2% by mass to 25% by mass, and still more preferably in a range of 5% by mass to 20% by mass based on the total mass of the printing pretreatment liquid according to the embodiment of the present disclosure.

Metal Complex

In the present disclosure, a metal complex indicates a compound in which a ligand is coordinated to a metal ion such as a zirconium ion, a titanium ion, or an aluminum ion.

Various commercially available metal complexes may be used as the metal complex used in the printing pretreatment liquid according to the embodiment of the present disclosure.

Further, various organic ligands and particularly various multidentate ligands that are capable of forming metal chelate catalysts are also commercially available. Accordingly, a metal complex prepared by combining a commercially available organic ligand with a metal may be used as the metal complex.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Pharmaceutical Manufacture Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and "ORGATIX ZC-126" (manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and ORGATIX ZC-126 (manufactured by Matsumoto Fine Chemical Co., Ltd.) are preferable.

Hansen Solubility Parameter of Aggregating Agent

It is preferable the aggregating agent has a Hansen solubility parameter value (HSP value) of 15 MPa$^{1/2}$ to 80 MPa$^{1/2}$.

In a case where the HSP value of the aggregating agent is in the above-described range, the adhesiveness between the polyester base material and the image formed using an ink containing a colorant and water is further enhanced.

The HSP value of the aggregating agent is more preferably in a range of 20 MPa$^{1/2}$ to 60 MPa$^{1/2}$ and still more preferably in a range of 25 MPa$^{1/2}$ to 40 MPa$^{1/2}$.

Here, the HSP value of the aggregating agent is calculated according to the above-described method.

Hereinafter, preferred examples of the aggregating agent having an HSP value in the above-described range will be described. The values in parentheses indicate HSP values.

Organic acid: malonic acid (32.5 MPa$^{1/2}$), glutaric acid (28.1 MPa$^{1/2}$)
Polyvalent metal salt: magnesium sulfate (64.9 MPa$^{1/2}$)
Cationic compound: polyallylamine (19.8 MPa$^{1/2}$)

Other Components

Water-Soluble Solvent

The printing pretreatment liquid may contain at least one water-soluble solvent.

As the water-soluble solvent, known solvents can be used without particular limitation.

Examples of the water-soluble solvent include glycols such as glycerin, 1,2,6-hexanetriol, trimethylolpropane, ethylene glycol, propylene glycol, diethylene glycol, triethylene glycol, tetraethylene glycol, pentaethylene glycol, and dipropylene glycol; polyhydric alcohols, for example, alkanediol such as 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among these, from the viewpoint of suppressing peeling of the image, polyalkylene glycol in glycols or a derivative thereof is preferable; and at least one selected from diethylene glycol monoalkyl ether, triethylene glycol monoalkyl ether, dipropylene glycol, tripropylene glycol monoalkyl ether, polyoxypropylene glyceryl ether, or polyoxyethylene polyoxypropylene glycol is more preferable.

From the viewpoint that the printing pretreatment liquid contains a water-soluble solvent, the content of the water-soluble solvent is preferably in a range of 3% by mass to 20% by mass and more preferably in a range of 5% by mass to 15% by mass with respect to the total mass of the printing pretreatment liquid.

Surfactant

The printing pretreatment liquid may contain at least one surfactant.

The surfactant can be used as a surface tension adjuster or an antifoaming agent.

Examples of the surface tension adjuster or the antifoaming agent include a nonionic surfactant, a cationic surfactant, an anionic surfactant, and a betaine surfactant. Among these, from the viewpoint of the aggregation rate of the ink, a nonionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

The content of the surfactant in the printing pretreatment liquid is not particularly limited, but the content thereof can be set such that the surface tension of the printing pretreatment liquid reaches preferably 50 mN/m or less, more preferably in a range of 20 mN/m to 50 mN/m, and still more preferably in a range of 30 mN/m to 45 mN/m.

Other Additives

The printing pretreatment liquid may contain other components in addition to those described above as necessary.

Examples of other components which can be contained in the printing pretreatment liquid include known additives such as a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, and a chelating agent.

Physical Properties of Printing Pretreatment Liquid

From the viewpoint of the aggregation rate of the ink, the pH of the printing pretreatment liquid at 25° C. is preferably in a range of 0.1 to 3.5.

In a case where the pH of the printing pretreatment liquid is 0.1 or greater, the roughness of the polyester base material is further decreased and the adhesiveness of the image area is further improved.

In a case where the pH of the printing pretreatment liquid is 3.5 or less, the aggregation rate is further improved, coalescence of dots (ink dots) caused by the ink on the polyester base material is further suppressed, and the roughness of the image is further decreased.

The pH (25° C.) of the printing pretreatment liquid is more preferably in a range of 0.2 to 2.0.

From the viewpoint of the aggregation rate of the ink, the viscosity of the printing pretreatment liquid is preferably in a range of 0.5 mPa·s to 10 mPa·s and more preferably in a range of 1 mPa·s to 5 mPa·s.

The viscosity of the printing pretreatment liquid is measured at 25° C. using VISCOMTER TV-22 (manufactured by Toki Sangyo Co., Ltd.).

The surface tension of the printing pretreatment liquid at 25° C. is preferably 60 mN/m or less, more preferably in a range of 20 mN/m to 50 mN/m, and still more preferably in a range of 30 mN/m to 45 mN/m.

In a case where the surface tension of the printing pretreatment liquid is in the above-described range, the adhesiveness between the polyester base material and the printing pretreatment liquid is improved.

The surface tension of the printing pretreatment liquid is measured using an Automatic Surface Tensiometer CBVP-Z (manufactured by Kyowa Interface Science Co., Ltd.) according to a plate method.

Base Material for Printing

A base material for printing according to the embodiment of the present disclosure includes a polyester base material and a treatment layer which is provided on at least one surface of the polyester base material and contains the solid content of the above-described printing pretreatment liquid according to the embodiment of the present disclosure.

Polyester Base Material

A polyester base material indicates any of a base material containing a polyester resin as a main component and a base material having a surface coated with a polyester resin.

It is particularly preferable that the polyester base material is a polyethylene terephthalate (that is, PET) base material.

The polyester base material has impermeability in which water contained in the ink is unlikely to be absorbed or not absorbed. Specifically, the polyester base material is a base material having a water absorption amount of 10.0 g/m$^2$ or less.

The water absorption amount of the polyester base material is maintained at 25° C. for 1 minute in a state where water is brought into contact with a region having a size of 100 mm×100 mm on the image recording surface of the polyester base material, and the mass of absorbed water is acquired so that the absorption amount per unit area can be calculated.

The form of the polyester base material is not particularly limited, and examples thereof include a sheet shape and a film shape.

From the viewpoint of the productivity of the printed material, it is preferable that the form of the polyester base material is a long sheet or film wound in a roll shape.

The polyester base material may have been subjected to a surface treatment.

Examples of the surface treatment include a corona treatment, a plasma treatment, a flame treatment, a heat treatment, an abrasion treatment, and a light irradiation treatment (such as a UV treatment), but the present invention is not limited thereto.

For example, in a case where a corona treatment is applied to the surface of the polyester base material before the ink is applied to record an image, the surface energy of the polyester base material increases, and the wetting of the surface of the polyester base material and adhesion of the ink to the polyester base material are promoted. The corona treatment can be performed using Corona Master (manufactured by Shinko Electric & Instrumentation Co., Ltd., PS-10S) or the like.

The conditions for the corona treatment may be appropriately selected depending on the circumstances such as the kind of the polyester base material and the composition of the ink. For example, the following treatment conditions may be employed.

Treatment voltage: 10 to 15.6 kV
Treatment speed: 30 to 100 mm/s

Treatment Layer

The base material for printing according to embodiment of the present disclosure includes a treatment layer containing the solid content of the above-described printing pretreatment liquid according to the embodiment of the present disclosure.

That is, the treatment layer in the base material for printing is a layer containing a water-soluble polymer compound, a surfactant, and other additives as necessary, in addition to the specific polymer and the aggregating agent described above.

The treatment layer may be formed on at least a part of the surface to be printed in the base material for printing, and examples of the form include a form in which the treatment layer is formed on the entire surface to be printed and a form in which the treatment layer is formed on a site from which end portions (that is, non-printing portions) of the surface to be printed are removed.

In a case where the polyester base material has a sheet shape or a film shape, the treatment layer may be formed on one surface or both surfaces of the polyester base material.

In the present disclosure, the treatment layer may be a continuous layer, a discontinuous layer, or a layer with a non-uniform thickness.

The thickness of the treatment layer containing the above-described solid content is preferably in a range of 0.01 μm to 10 μm and more preferably in a range of 0.05 μm to 1 μm.

The thickness of the treatment layer is measured by cutting the base material for printing and observing the cut surface with a scanning electron microscope. Specifically, according to a method of measuring the thickness, a sample is cooled with liquid nitrogen, the sample is thinly sectioned using a microtome, and the thicknesses of five optional cross-sectional portions are measured. The thickness of the treatment layer is set as an average of the measured thicknesses at five sites.

It is preferable that the treatment layer does not contain water or the content of water is greater than 0% by mass and 20% by mass or less with respect to the total mass of the treatment layer and more preferable that the treatment layer does not contain water or the total content of water is greater than 0% by mass and 5% by mass or less with respect to the total mass of the solid content.

The content of water content is measured according to the following Karl Fischer measurement method.

The moisture content (mg) is measured using a Karl Fischer Moisture Meter (Mitsubishi Chemical Analytech CA-06 type Coulometric titration moisture analyzer), and the moisture content (%) is calculated based on Equation (A). Further, the measurement sample indicates a sample taken out of the treatment layer.

Moisture content (%)=[moisture content (mg)/measurement sample (mg)]×10     Equation (A)

Detailed conditions for the measurement are in conformity with JIS K0113: 2005.

The treatment layer is obtained, for example, by drying the printing pretreatment liquid according to the embodiment of the present disclosure.

Here, the drying indicates that at least some of the water contained in the printing pretreatment liquid is removed.

The drying method is not particularly limited, and examples thereof include drying by heating, drying by air blowing, and natural drying.

From the viewpoints of enhancing the adhesiveness of the image and suppressing the peeling of the image, it is preferable that the amount of the treatment layer in the base material for printing is set such that the amount of the specific polymer is in a range of 0.1 g/m$^2$ to 3.0 g/m$^2$ and more preferable that the amount of the treatment layer is set such that the amount of the specific polymer is in a range of 0.3 g/m$^2$ to 2.0 g/m$^2$.

Method of Producing Base Material for Printing

The method of producing a base material for printing according to the embodiment of the present disclosure includes a step of applying the printing pretreatment liquid according to the embodiment of the present disclosure onto the polyester base material (hereinafter, also referred to as a pretreatment liquid application step).

It is preferable that the method of producing a base material for printing includes a step of drying the applied printing pretreatment liquid (hereinafter, also referred to as a drying step) after the step of applying the printing pretreatment liquid (that is, the pretreatment liquid application step).

Pretreatment Liquid Application Step

The pretreatment liquid application step in the method of producing a base material for printing can be performed by employing a known method such as a coating method, an ink jet method, or an immersion method.

The application can be performed according to a known coating method using a bar coater, an extrusion die coater, an air doctor coater, a blade coater, a rod coater, a knife coater, a squeeze coater, or a reverse roll coater.

The details of the ink jet method are the same as the details of the ink jet method in an image recording step described below.

Drying Step

The drying of the printing pretreatment liquid in the method of producing a base material for printing may be any of drying by heating, drying by air blowing, and natural drying. Among these, drying by heating is preferable.

Examples of the means for performing heating and drying include known heating means such as a heater, known air blowing means such as a dryer, and means for combining these.

The heating temperature at the time of heating and drying is preferably 60° C. or higher, more preferably 65° C. or higher, and particularly preferably 70° C. or higher.

The upper limit of the heating temperature is not particularly limited, and the upper limit thereof may be 100° C. and preferably 90° C.

Ink Set

An ink set according to the embodiment of the present disclosure includes an ink composition containing a colorant and water, and the printing pretreatment liquid according to the embodiment of the present disclosure.

Specific examples thereof include an ink set that contains an ink compositions of four colors of cyan, magenta, yellow, and black and the printing pretreatment liquid according to the embodiment of the present disclosure.

Hereinafter, the ink composition contained in the ink set according to the embodiment of the present disclosure will be described in detail.

Ink Composition

Hereinafter, the ink composition contained in the ink set according to the embodiment of the present disclosure will be described.

It is preferable that the ink composition is an aqueous ink containing a colorant and water.

In the present disclosure, the aqueous ink indicates an ink composition containing 50% by mass or greater of water with respect to the total mass of the ink.

Further, the content of the organic solvent in the ink composition is preferably 40% by mass or less and more preferably 30% by mass or less with respect to the total mass of the ink composition.

Further, it is preferable that the ink composition does not contain a polymerizable compound or the content of the polymerizable compound is greater than 0% by mass and 10% by mass or less and more preferable that the ink composition does not contain a polymerizable compound.

Examples of the polymerizable compound include a cationic polymerizable compound and a radically polymerizable compound.

Colorant

The ink composition contains a colorant. The colorant is not particularly limited and a colorant known in the field of the ink jet ink can be used, but an organic pigment or an inorganic pigment is preferable.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, barium yellow, cadmium red, chrome yellow, and carbon black. Among these, carbon black is particularly preferable.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, still more preferably in a range of 5% by mass to 20% by mass, and particularly preferably in a range of 5% by mass to 15% by mass with respect to the total mass of the ink composition.

Water

The ink composition contains water.

The content of water is preferably in a range of 50% by mass to 90% by mass and more preferably in a range of 60% by mass to 80% by mass with respect to the total mass of the ink composition.

Dispersant

The ink composition may contain a dispersant for dispersing the colorant.

As the dispersant, any of a polymer dispersant or a low-molecular-weight surfactant-type dispersing agent may be used. Further, as the polymer dispersant, any of a water-soluble dispersant and a water-insoluble dispersant may be used.

Preferred examples of the dispersant include dispersants described in paragraphs 0080 to 0096 of JP2016-145312A.

The mixing mass ratio between a colorant (p) and a dispersant (s) (p:s) is preferably in a range of 1:0.06 to 1:3, more preferably in a range of 1:0.125 to 1:2, and still more preferably in a range of 1:0.125 to 1:1.5.

Resin Particles

It is preferable that the ink composition contains at least one kind of resin particles. In a case where the ink composition contains resin particles, the fixing property of mainly the ink composition to the polyester base material and the rub resistance of the image can be improved. Further, the resin particles have a function of fixing the ink composition, (that is, an image obtained using the ink composition) by being unstably aggregated or dispersed at the time of being contact with the aggregating agent described above and thickening the ink composition. It is preferable that such resin particles are dispersed in water or a mixture of water and an organic solvent.

Preferred examples of the resin particles include the resin particles described in paragraphs 0062 to 0076 of JP2016-188345A.

Water-Soluble Organic Solvent

It is preferable that the ink composition used in the present disclosure contains at least one water-soluble organic solvent.

By using a water-soluble organic solvent, the effect of preventing drying of the ink composition and the effect of wetting of the ink composition can be obtained. The water-soluble organic solvent is used as an anti-drying agent for preventing clogging of the ink composition after the ink composition adheres and is dried at an ink jet port of an ejection nozzle to form an aggregate. Further, a water-soluble organic solvent having a lower vapor pressure than that of water is preferable for preventing drying of the ink composition and for wetting of the ink composition.

As the anti-drying agent, a water-soluble organic solvent which has a lower vapor pressure than that of water is preferable. Specific examples of such a water-soluble organic solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof.

The content of the anti-drying agent is preferably in a range of 10% to 50% by mass with respect to the total mass of the ink composition.

The water-soluble organic solvent is used for adjusting the viscosity in addition to the purposes described above.

Specific examples of the water-soluble organic solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyl diethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

Even in a case where the water-soluble organic solvent is used for adjusting the viscosity, the water-soluble organic solvent may also be used alone or in combination of two or more kinds thereof.

Other Additives

The ink composition can be formed using additives other than the above-described components.

Examples of other additives include known additives such as an anti-drying agent (wetting agent) other than those described above, a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersant other than those described above, a dispersion stabilizer, a rust inhibitor, and a chelating agent.

Image Recording Method

An image recording method according to the present disclosure includes a step of applying the printing pretreatment liquid according to the embodiment of the present disclosure to a surface of the polyester base material (hereinafter, also referred to as a "pretreatment liquid application step"), and a step of jetting the ink composition containing a colorant and water by an ink jet method onto the surface to which the printing pretreatment liquid has been applied and recording an image (hereinafter, also referred to as an "image recording step").

Pretreatment Liquid Application Step

The pretreatment liquid application step in the image recording method can be performed by employing a known method such as a coating method, an ink jet method, or an immersion method.

The application can be performed according to a known coating method using a bar coater, an extrusion die coater, an air doctor coater, a blade coater, a rod coater, a knife coater, a squeeze coater, or a reverse roll coater.

The details of the ink jet method are the same as the details of the ink jet method in an image recording step described below.

The application amount of the printing pretreatment liquid is not particularly limited as long as the ink composition can be aggregated. However, from the viewpoints of enhancing the adhesiveness of the image and suppressing the peeling of the image, it is preferable that the application amount of the printing pretreatment liquid is set such that the application amount of the printing pretreatment liquid after being dried reaches 0.05 $g/m^2$ or greater and more preferable that the application amount thereof is set such that the application amount of the printing pretreatment liquid after being dried reaches 0.05 $g/m^2$ to 1.0 $g/m^2$.

Further, the polyester base material may be heated before the printing pretreatment liquid is applied.

The heating temperature may be appropriately set depending on the kind of the polyester base material and the composition of the printing pretreatment liquid, but the temperature of the polyester base material is preferably in a range of 30° C. to 70° C. and more preferably in a range of 30° C. to 60° C.

As the polyester base material used in the image recording method according to the embodiment of the present disclosure, as necessary, a surface-treated polyester base material may be used. Alternatively, a surface treatment may be performed on a polyester base material before being coated with the printing pretreatment liquid in the pretreatment liquid application step using a polyester base material to which the surface treatment has not been subjected. Examples of the surface treatment include the treatment described as the surface treatment of the polyester base material in the base material for printing according to the present disclosure, and these treatments can be performed by a known method.

Image Recording Step

In the image recording step according to the image recording method, an image is recorded by jetting the ink composition containing a colorant and water onto the surface of the polyester base material to which the printing pretreatment liquid has been applied according to an ink jet method.

That is, the image recording step is a step of applying the ink composition to the polyester base material according to an ink jet method.

In this step, the ink (that is, the ink composition containing a colorant and water) can be selectively applied onto the polyester base material (specifically, the surface of the polyester base material to which the printing pretreatment liquid has been applied) to form a desired visible image.

As the ink composition used in the image recording step, the above-described ink composition contained in the ink set according to the embodiment of the present disclosure is suitably used.

In the image formation according to an ink jet method, a colored image is formed by providing the energy so that the ink is jetted onto a desired polyester base material.

Further, as a preferable ink jet method in the present disclosure, the method described in paragraphs 0093 to 0105 of JP2003-306623A can be employed.

The ink jet method is not particularly limited, and examples of known methods include an electric charge control method of jetting an ink using electrostatic attraction force; a drop-on-demand method (pressure pulse method) using a vibration pressure of a piezoelectric element; an acoustic ink jet method of jetting an ink using a radiation pressure by changing an electric signal into an acoustic beam and applying the acoustic beam to the ink; and a thermal ink jet (also referred to as a bubble jet (registered trademark)) method of heating an ink to form bubbles and utilizing the generated pressure. As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

A short serial head is used as the ink jet head, and there are two systems for the ink jet head, which are a shuttle system of performing recording while scanning a head in the width direction of the polyester base material and a line system of using a line head in which recording elements are aligned in correspondence with the entire area of one side of the polyester base material. In the line system, image recording can be performed on the entire surface of the polyester base material by scanning the polyester base material in a direction intersecting the direction in which the recording elements are aligned. Therefore, a transport system such as a carriage that scans a short head becomes unnecessary. Further, since movement of a carriage and complicated scanning control between the head and the polyester base material become unnecessary and only the polyester base material moves, the recording at a higher recording speed compared to the shuttle system can be realized. The image recording method according to the embodiment of the present disclosure can be applied to any of these, but an effect of improving the jetting accuracy and the rub resistance of an image increases in a case where the image recording method is applied to the line system that does not perform a dummy jet.

From the viewpoint of obtaining an image with high definition, the liquid droplet amount of the ink to be jetted from the ink jet head is preferably in a range of 1 pl (pico liter) to 10 pl and more preferably in a range of 1.5 pl to 6 pl. In addition, from the viewpoints of improving the image irregularity and improving connection of continuous gradations, it is also effective that the ink is jetted by combining different amounts of liquid droplets.

Drying Step

The image recording method according to the embodiment of the present disclosure may include a drying step.

The drying step can be performed at any one or both timings after the pretreatment liquid application step and before the image recording step and after the image recording step.

As the drying in the drying step, drying by heating is preferable. Examples of the means for performing heating and drying include known heating means such as a heater, known air blowing means such as a dryer, and means for combining these.

In the heating step after the image recording step, the image can be dried by being heated.

Examples of the method of performing heating and drying the image include a method of applying heat from a side of the polyester base material opposite to the image recording surface thereof using a heater or the like, a method of applying warm air or hot air to the image recording surface of the polyester base material, a method of applying heat from the image recording surface of the polyester base material or from a side of the polyester base material opposite to the image recording surface using an infrared heater, and a method of combining a plurality of these methods.

The heating temperature of the image at the time of heating and drying is preferably 60° C. or higher, more preferably 65° C. or higher, and particularly preferably 70° C. or higher.

The upper limit of the heating temperature is not particularly limited, and the upper limit thereof may be 100° C. and preferably 90° C.

The time of heating and drying the image is not particularly limited, but is preferably in a range of 3 seconds to 60 seconds, more preferably in a range of 5 seconds to 30 seconds, and particularly preferably in a range of 5 seconds to 20 seconds.

Another Aspect of Image Recording Method

Another aspect of the image recording method according to the embodiment of the present disclosure includes a step of jetting the ink composition containing a colorant and water by an ink jet method onto a treatment layer of the base material for printing according to the embodiment of the present disclosure and recording an image.

The step of jetting the ink composition containing a colorant and water by an ink jet method onto the treatment layer of the base material for printing according to the embodiment of the present disclosure and recording an image is the same as the image recording step in the above-described image recording method, and the preferable aspects are also the same as described above.

Further, another aspect of the image recording method may include a drying step. The details of the drying step are the same as the drying step in the above-described image recording method, and the preferable aspects are also the same as described above.

Image Recorded Material

The image recorded material according to the embodiment of the present disclosure includes a polyester base material and an image which is provided on a surface of the polyester base material and contains the solid content of the above-described printing pretreatment liquid according to the embodiment of the present disclosure and a colorant.

The image recorded material according to the embodiment of the present disclosure is obtained using the above-described image recording method according to the embodiment of the present disclosure.

As described above, the printing pretreatment liquid according to the embodiment of the present disclosure contains a specific polymer and an aggregating agent. Since the colorant supplied from the ink is aggregated due to the function of the aggregating agent in the printing pretreatment liquid, and the adhesiveness between the colorant and the polyester base material is also enhanced due to the function of the specific polymer, the image recorded material according to the embodiment of the present disclosure has excellent adhesiveness of the image and excellent image quality.

Image Recording Device

An image recording device used for the image recording method according to the embodiment of the present disclosure is not particularly limited as long as the image recording device includes image recording means for performing an ink jet method.

As the image recording means for performing an ink jet method, for example, known ink jet recording devices described in JP2010-083021A, JP2009-234221A, and JP1998-175315A (JP-H10-175315A) can be used.

Hereinafter, an example of the image recording device which can be used for the image recording method according to the embodiment of the present disclosure will be described with reference to FIG. 1.

The image recording device illustrated in FIG. 1 includes pretreatment liquid application means for applying the printing pretreatment liquid, and image recording means for performing an ink jet method.

Here, FIG. 1 is a schematic configuration view illustrating a configuration example of the image recording device.

As illustrated in FIG. 1, the image recording device includes a printing pretreatment liquid application unit 12 which sequentially applies the printing pretreatment liquid to the surface of the polyester base material from the supply unit 11 of the polyester base material toward the transport direction of the polyester base material (the direction indicated by the arrows in the figure), a printing pretreatment liquid drying zone 13 comprising heating means (not illustrated) for drying the applied printing pretreatment liquid, and an ink jet unit 14 which jets various inks, and an ink drying zone 15 which dries the jetted ink.

The supply unit 11 of the polyester base material in the image recording device may be a supply unit that supplies the polyester base material from a case which is charged with the polyester base material or a supply unit that supplies the polyester base material from a roll around which the polyester base material is wound in a roll shape.

The polyester base material is sequentially sent by transport rollers 41, 42, 43, 44, 45, and 46 from the supply unit 11 through the printing pretreatment liquid application unit 12, the printing pretreatment liquid drying zone 13, the ink jet unit 14, and the ink drying zone 15, and then accumulated in an accumulation unit 16.

In the accumulation unit 16, the polyester base material may be wound in a roll shape. As the method of transporting the polyester base material, a drum transport system using a drum-shaped member, a belt transport system, or a stage transport system using a stage may be employed in addition to the method of carrying out transport using a transport roller illustrated in FIG. 1.

Among the plurality of arranged transport rollers 41, 42, 43, 44, 45, and 46, at least one transport roller can be formed into a driving roller to which the power of a motor (not illustrated) has been transmitted.

The polyester base material is transported at a predetermined transport speed in a predetermined direction by rotating the driving roller rotating by the motor at a constant speed.

The printing pretreatment liquid application unit 12 is provided with an anilox roller 20 disposed by being partially immersed in a storage tray in which the printing pretreatment liquid is stored and a coating roller 22 brought into contact with the anilox roller 20. The anilox roller 20 is a roller material for supplying a predetermined amount of the printing pretreatment liquid to the coating roller 22 disposed to oppose the image recording surface of the polyester base material. The polyester base material is uniformly coated with the printing pretreatment liquid by the coating roller 22 to which an appropriate amount of the printing pretreatment liquid has been supplied from the anilox roller 20.

The coating roller 22 is configured so as to transport the polyester base material in a pair with an opposing roller 24, and the polyester base material passes between the coating roller 22 and the opposing roller 24 and is sent to the printing pretreatment liquid drying zone 13.

The printing pretreatment liquid drying zone 13 is disposed downstream of the printing pretreatment liquid application unit 12 in the transport direction of the polyester base material.

The printing pretreatment liquid drying zone 13 can be configured to include known heating means such as a heater, air blowing means for blowing air such as a dryer or an air knife, and means for combining these.

Examples of the heating means include a method of installing a heating element such as a heater on a side of the polyester base material opposite to the surface to which the printing pretreatment liquid has been applied (for example, in a case where the polyester base material is automatically transported, below the transport mechanism for mounting and transporting the polyester base material), a method of applying warm air or hot air to the surface of the polyester base material to which the printing pretreatment liquid has been applied (that is, the image recording surface), and a heating method using an infrared heater. Further, the heating means may be a combination of a plurality of the above-described methods.

In the printing pretreatment liquid drying zone 13, the solvent may be removed from the printing pretreatment liquid using a solvent removal roller or the like.

The ink jet unit 14 is disposed downstream of the printing pretreatment liquid drying zone 13 in the transport direction of the polyester base material.

In the ink jet unit 14, recording heads (ink jet heads) 30K, 30C, 30M, 30Y, 30A, and 30B that are respectively connected to ink storage units storing inks with respective colors, which are black (K), cyan (C), magenta (M), yellow (Y), a special color ink (A), and a special color ink (B) are arranged. The respective ink storage units (not illustrated) are configured such that the ink containing colorants corresponding to each color tone and water is stored and supplied to respective ink jet heads 30K, 30C, 30M, 30Y, 30A, and 30B during image recording as necessary.

Examples of the special color ink (A) and the special color ink (B) include white ink, orange ink, green ink, purple ink, light cyan ink, and light magenta ink.

In the ink jet recording device applied to the image recording method according to the embodiment of the present disclosure, the ink jet heads 30A and 30B may not be provided. Further, the ink jet recording device may comprise other special color ink jet heads in addition to the ink jet heads 30A and 30B.

Further, it is described that the ink jet heads 30A and 30B are positioned downstream of the yellow (Y) ink jet head 30Y in the transport direction of the polyester base material in FIG. 1 for convenience, but the positions thereof are not particularly limited and may be appropriately set in consideration of the brightness or the like of the special color inks.

For example, a form in which the ink jet heads 30A and 30B are positioned between the yellow ink jet head 30Y and the magenta ink jet head 30M or a form in which the ink jet heads 30A and 30B are positioned between the magenta ink jet head 30M and the cyan ink jet head 30C is considered.

Further, it is preferable that the ink jet head 30B is a white ink jet head.

The ink jet heads 30K, 30C, 30M, 30Y, 30A, and 30B jet inks corresponding to each image from jet nozzles arranged to oppose the recording surface of the polyester base material. In this manner, each color ink is applied onto the image recording surface of the polyester base material, and thus a color image is recorded.

The ink jet heads 30 K, 30C, 30M, 30Y, 30A, and 30B are all full line heads in which a plurality of jet ports (nozzles) are aligned over the maximum recording width (maximum recording width) of an image to be recorded on the polyester base material. The image recording can be performed on the polyester base material at a higher speed compared to a serial type head in which recording is performed while reciprocating a short shuttle head in the width direction (a direction orthogonal to the transport direction of the polyester base material) of the polyester base material.

In the present disclosure, any recording system, for example, a system that enables serial type recording or recording at a relatively high speed, such as a single pass system of forming one line by performing scanning once may be employed. According to the image recording method according to the embodiment of the present disclosure, a high-quality image with excellent reproducibility can be obtained even with the single pass system.

Here, the ink jet heads 30K, 30C, 30M, 30Y, 30A, and 30B all have the same structure.

It is preferable that the application amount of the printing pretreatment liquid and the application amount of the ink are adjusted as necessary. For example, the application amount of the printing pretreatment liquid may be changed in order to adjust the physical properties such as the viscoelasticity and the like of the aggregate obtained by mixing the printing pretreatment liquid and the ink, depending on the polyester base material.

The ink drying zone 15 is disposed on downstream of the ink jet unit 14 in the transport direction of the polyester base material.

The ink drying zone 15 can be configured in the same manner as the printing pretreatment liquid drying zone 13.

The image recording device may further comprise heating means for performing a heating treatment on the polyester base material in a transport path from the supply unit 11 to the accumulation unit 16.

For example, drying of the printing pretreatment liquid and drying and fixing the ink can be effectively performed by disposing the heating means at a desired position such as upstream of the printing pretreatment liquid drying zone 13 or between the ink jet unit 14 and the ink drying zone 15 so that the polyester base material is heated to a desired temperature.

Further, since the surface temperature of the polyester base material changes depending on the kind (the material, the thickness, or the like) of the polyester base material, the environmental temperature, and the like, it is preferable that the image recording device comprises a heating control mechanism including a measuring unit that measures the surface temperature of the polyester base material; a heating control mechanism that controls the heating conditions; and a control unit that feeds back the value of the surface temperature of the polyester base material measured by the measuring unit to the heating control unit.

In a case where the image recording device comprises the heating control mechanism, application of the printing pretreatment liquid and application of the ink can be performed while the temperature of the polyester base material is controlled.

As the measuring unit that measures the surface temperature of the polyester base material, a contact or non-contact type thermometer is preferable.

EXAMPLES

Hereinafter, the present invention will be described in more detail based on examples, but the present invention is not limited to the following examples unless the gist thereof is overstepped. Further, "parts" and "%" are on a mass basis unless otherwise specified.

Synthesis Example 1

A mixture of dimethyl terephthalate (abbreviation: TPA-Me, manufactured by Fujifilm Wako Pure Chemical Corporation, 80.00 g, 0.412 mol), dimethyl sodium 5-sulfoisophthalate (abbreviation: SSIPA-Me, manufactured by Tokyo Chemical Industry Co., Ltd., 26.79 g, 0.0904 mol), diethylene glycol (abbreviation: DECG, manufactured by Fujifilm Wako Pure Chemical Corporation, 57.58 g, 0.543 mol), cyclohexanedimethanol (abbreviation: CHDM, manufactured by Fujifilm Wako Pure Chemical Corporation, 33.33 g, 0.231 mol), and tetraethyl orthotitanate (manufactured by Tokyo Chemical Industry Co., Ltd., 100 µL) was heated and stirred at 200° C. for 3 hours under a nitrogen stream so that generated methanol was distilled off.

Next, the mixture was heated and stirred at 250° C. for 3 hours under reduced pressure at 2 Torr or less, and a transesterification reaction was carried out while excess diethylene glycol was removed. Thereafter, the obtained reaction product was taken out into a heat-resistant container processed with Teflon (registered trademark), thereby obtaining a polyester polymer P-1.

Synthesis Examples 2 to 10 and Comparative Synthesis Example 1

Polyester polymers P-2 to P-9 and polyamide polymers P-10 and H-1 were obtained by performing the same reaction as in Synthesis Example 1 except that the monomer components and the composition used in Synthesis Example 1 were changed to the monomer components and the composition listed in Table 4.

Preparation of Aqueous Dispersion of Polyester Polymer and Polyamide Polymer

75% by mass of water and 5% by mass of isopropanol were added to the polymers P-1 to P-8, P-10, and H-1 such that the concentration of the polymers was set to 20% by mass, and the mixture was heated and stirred at 80° C. for 1 hour, thereby obtaining polymer aqueous dispersions PE-1 to PE-8, PE-10, and RE-1.

Further, 50% by mass of water and 50% by mass of isopropanol were added to the polymer P-9 such that the concentration of the polymer was set to 10% by mass, and the following procedures were the same as described above, thereby obtaining a polymer aqueous dispersion PE-9.

Synthesis Example 11

15.2 g of NEOPELEX G-15 (manufactured by Kao Corporation, 16 mass % aqueous solution) and 765 g of water were added to a 2000 mL three-neck flask comprising a stirrer and a cooling pipe, and the solution was heated to 90° C. in a nitrogen atmosphere.

A solution A obtained by dissolving 17.9 g (0.04 mol) of a 50 mass % aqueous solution of sodium 2-acryl amido-2-methyl propanesulfonate (abbreviation: AMPS) (manufactured by Sigma-Aldrich Co., LLC) and 9.99 g (0.12 mol) of methacrylamide (abbreviation: MAAm, manufactured by Tokyo Chemical Industry Co., Ltd.) in 66.9 g of water, a solution B obtained by mixing 16.3 g (0.16 mol) of styrene (abbreviation: St, manufactured by Wako Pure Chemical Industries, Ltd.) 49.7 g (0.35 mol) of 4-acryloylmorpholine (abbreviation: ACMO, Tokyo Chemical Industry Co., Ltd.), and 15.0 g (0.12 mol) of normal butyl acrylate (BA, Tokyo Chemical Industry Co., Ltd.), and a solvent C obtained by dissolving 5.93 g of sodium persulfate (manufactured by Fujifilm Wako Pure Chemical Corporation) in 59.3 g of water were simultaneously added dropwise to the heated mixed solution in the three-neck flask for 6 hours. After dropwise addition, the mixed solution was allowed to react for 3 hours, thereby obtaining a polymer aqueous dispersion PE-11 containing a (meth)acrylic polymer P-11.

The polymer concentration in the vinyl polymer aqueous dispersion PE-11 was 10% by mass.

Synthesis Examples 12 to 14 and Comparative Synthesis Example 2

Polymers PE-12 to PH-14 and HE-2 containing (meth)acrylic polymers P-12 to P-14 and H-2 were obtained by performing the same reaction as in Synthesis Example 11 except that the monomer components and the composition used in Synthesis Example 11 were changed to the monomer components and the composition listed in Table 5.

The polymer concentrations in the vinyl polymer aqueous dispersions PE-12 to 14 and HE-2 were respectively 10% by mass.

Measurement of Physical Properties of Polymer

The HSP values of the polymers obtained in Synthesis Examples 1 to 12 and Comparative Synthesis Examples 1 and 2 were acquired according to the above-described method, and the glass transition temperatures (Tg) and the weight-average molecular weights (Mw) thereof were measured according to the above-described method.

The results are listed in Tables 4 and 5.

TABLE 4

| | Polymer aqueous dispersion No. | Polymer No. | Monomer component and composition thereof (% by mole) | | | | | | Physical properties of polymer | | |
|---|---|---|---|---|---|---|---|---|---|---|---|
| | | | Dicarboxylic acid | | | Diol | | Diamine | HSP value $(MPa^{0.5})$ | Tg (° C.) | Mw |
| | | | TPA-Me | IPA-Me | SSIPA-Me | DEG | CHDM | HMDA | | | |
| Synthesis Example 1 | PE-1 | P-1 | 41 | — | 9 | 27 | 23 | — | 22.5 | 55 | 45000 |
| Synthesis Example 2 | PE-2 | P-2 | 21 | 21 | 9 | 27 | 23 | — | 22.3 | 46 | 40000 |
| Synthesis Example 3 | PE-3 | P-3 | — | 28 | 22 | 27 | 23 | — | 23.8 | 70 | 34000 |
| Synthesis Example 4 | PE-4 | P-4 | 24 | 24 | 2 | 10 | 40 | — | 21.2 | 51 | 35000 |
| Synthesis Example 5 | PE-5 | P-5 | — | 28 | 22 | 40 | 10 | — | 24.3 | 65 | 36000 |
| Synthesis Example 6 | PE-6 | P-6 | — | 48 | 2 | — | 50 | — | 20.9 | 52 | 30000 |
| Synthesis Example 7 | PE-7 | P-7 | — | 41 | 9 | 27 | 23 | — | 22.1 | 38 | 42000 |
| Synthesis Example 8 | PE-8 | P-8 | — | 41 | 9 | 14 | 23 | 13.5 | 23.2 | 54 | 15000 |
| Synthesis Example 9 | PE-9 | P-9 | 25 | 25 | — | 50 | — | — | 21.5 | 45 | 44000 |

TABLE 4-continued

| Polymer aqueous dispersion No. | Polymer No. | Monomer component and composition thereof (% by mole) | | | | | | Physical properties of polymer | | |
|---|---|---|---|---|---|---|---|---|---|---|
| | | Dicarboxylic acid | | | Diol | | Diamine | HSP value $(MPa^{0.5})$ | Tg (°C) | Mw |
| | | TPA-Me | IPA-Me | SSIPA-Me | DEG | CHDM | HMDA | | | |
| Synthesis Example 10 | PE-10 / P-10 | — | 20 | 30 | — | — | 50 | 29.6 | 75 | 12000 |
| Comparative Synthesis Example 1 | HE-1 / H-1 | — | 10 | 40 | — | — | 50 | 30.9 | 85 | 10000 |

TABLE 5

| Polymer aqueous dispersion No. | Polymer No. | Monomer component and composition thereof (% by mole) | | | | | | Physical properties of polymer | | |
|---|---|---|---|---|---|---|---|---|---|---|
| | | AMPS | St | MAAm | ACMO | HEAAm | BA | HSP value $(MPa^{0.5})$ | Tg (°C) | Mw |
| Synthesis Example 11 | PE-11 / P-1 | 5 | 20 | 15 | 45 | — | 15 | 22.3 | 151 | 100000 |
| Synthesis Example 12 | PE-12 / P-2 | 5 | 30 | — | — | — | 65 | 18.3 | 45 | 31000 |
| Synthesis Example 13 | PE-13 / P-3 | 5 | 30 | — | — | 30 | 35 | 23.1 | 140 | 98000 |
| Synthesis Example 14 | PE-14 / P-4 | 30 | 40 | — | — | — | 30 | 20.3 | 142 | 74000 |
| Comparative Synthesis Example 1 | HE-2 / H-2 | — | 27 | — | — | — | 73 | 17.9 | 32 | 37000 |

In Tables 4 and 5, the numerical values listed in the columns of the monomer component indicate the molar ratios (% by mole) of the amount of each monomer used, and the description of "-" indicates that the corresponding monomer component is not used.

In addition, compounds described by abbreviations in the columns of the monomer component are compounds represented by the following structural formulae. In the following structural formulae, "Me" represents a methyl group.

IPA-Me is an abbreviation for dimethyl isophthalate, HMDA is an abbreviation for hexamethylenediamine, and HEAAm is an abbreviation for 2-hydroxyethylacrylamide.

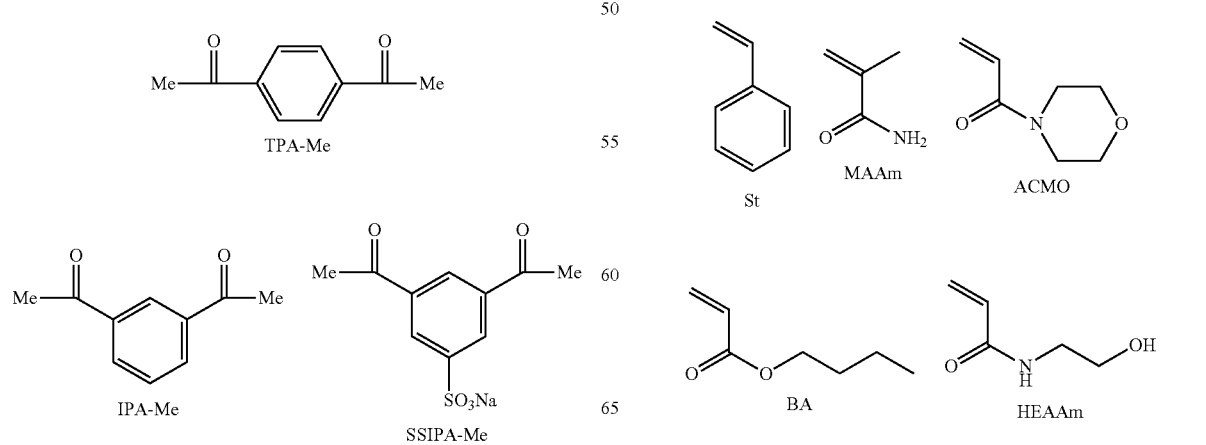

Preparation of Self-Dispersing Polymer Particle Aqueous Dispersion for Addition of Ink A three-neck flask comprising a stirrer, a thermometer, a reflux cooling pipe, and a nitrogen gas introduction pipe was charged with 360.0 g of methyl ethyl ketone, and the solution was heated to 75° C. Next, a mixed solution formed of 144.0 g of benzyl methacrylate, 180.0 g of methyl methacrylate, 36.0 g of methacrylic acid, 72 g of methyl ethyl ketone, and 1.44 g of "V-601" (polymerization initiator, manufactured by Fujifilm Wako Pure Chemical Corporation, compound name: dimethyl 2,2'-azobis(2-methyl propionate)) was added dropwise to the methyl ethyl ketone at a constant speed such that the dropwise addition was completed for 2 hours while the temperature in the flask was maintained at 75° C. After completion of the dropwise addition, a solution formed of 0.72 g of "V-601" and 36.0 g of methyl ethyl ketone was added thereto, and the resulting solution was stirred at 75° C. for 2 hours, a solution formed of 0.72 g of "V-601" and 36.0 g of isopropanol was further added thereto, and the resulting solution was stirred at 75° C. for 2 hours. Thereafter, the solution was heated to 85° C. and further stirred for 2 hours to obtain a polymer solution of a benzyl methacrylate/methyl methacrylate/methacrylic acid (=40/50/10 (mass ratio)) copolymer.

The weight-average molecular weight (Mw) of the obtained copolymer which was measured in the same manner as described above was 54000 (calculated in terms of polystyrene according to gel permeation chromatography (GPC)), and the acid value thereof was 61.9 mgKOH/g.

Next, 668.3 g of the obtained polymer solution was weighed, 388.3 g of isopropanol and 145.7 ml of a 1 mol/L NaOH aqueous solution were added thereto, and the temperature in the reaction container was increased to 80° C. Next, 720.1 g of distilled water was added dropwise at a constant speed of 20 ml/min for water dispersion, and the temperature in the reaction container was maintained at 80° C. for 2 hours, 85° C. for 2 hours, and 90° C. for 2 hours in an atmospheric pressure. Thereafter, the pressure inside the reaction container was reduced, and a total of 913.7 g of isopropanol, methyl ethyl ketone and distilled water were distilled off, thereby obtaining a self-dispersing polymer particle aqueous dispersion whose concentration of solid contents (concentration of polymer particles) was 28.0% by mass.

Preparation of Ink Composition

Respective components described in the section of "composition of magenta ink" below were mixed to prepare magenta ink.

Further, respective components described in the section of "composition of cyan ink" below were mixed to prepare cyan ink.

Composition of Magenta Ink

Projet Magenta APD1000 (manufactured by FUJIFILM Imaging Colorants Ltd, magenta pigment dispersion liquid, pigment concentration: 14% by mass): 30% by mass
Self-dispersing polymer particle aqueous dispersion: 8% by mass
Propylene glycol (PG): 20.0% by mass
OLFINE E1010 (surfactant, manufactured by Nissan Chemical Co., Ltd.): 1.0% by mass
Ion exchange water: remaining amount set such that the total amount of the composition was 100% by mass Composition of Cyan Ink Projet Cyan APD1000 (manufactured by FUJIFILM Imaging Colorants Ltd., cyan pigment dispersion liquid, pigment concentration: 12% by mass): 20% by mass
Self-dispersing polymer particle aqueous dispersion: 8% by mass
Propylene glycol (PG: water-soluble solvent): 20.0% by mass
OLFINE E1010 (surfactant, manufactured by Nissan Chemical Co., Ltd.): 1.0% by mass
Ion exchange water: remaining amount set such that the total amount of the composition was 100% by mass Examples 1 to 22 and Comparative Examples 1 and 2

Preparation of Printing Pretreatment Liquid

The respective components described in "Composition of printing pretreatment liquid" described below were mixed to prepare printing pretreatment liquids of Examples 1 to 22 and Comparative Examples 1 and 2.

In Example 21, as the polymer aqueous dispersion, polymer aqueous dispersions PE-4 and RE-1 were mixed such that the molar ratio between X and Y (X:Y) was set to 80:20 in a case where the total moles of respective constitutional units of the polymer P-4 was set as A and the total moles of respective constitutional units of the polymer H-1 was set as B. At the time of mixing the aqueous dispersions, the molar ratio (X:Y=80:20) was calculated in terms of the mass ratio, and the aqueous dispersions were mixed at a weight ratio (x:y=76.8:23.2).

Composition of Printing Pretreatment Liquid

Polymer aqueous dispersion: the kind and the amount are listed in Table 6
Aggregating agent: the kind and the amount are listed in Table 6
Propylene glycol (PG): 10.0% by mass
Antifoaming agent (TSA-739 (15%), manufactured by Momentive Performance Materials Japan LLC, emulsion type silicone antifoaming agent): 0.01% by mass as the solid content of the antifoaming agent.
Ion exchanged water: remaining amount set such that the total amount of the composition was 100% by mass Recording and Evaluation of Image After each of the printing pretreatment liquids of Examples 1 to 22 and Comparative Examples 1 and 2 was applied to the polyester base material, images were recorded, and then the following various evaluations were performed.

The results are collectively listed in Table 6.

Evaluation of Adhesiveness

FE2001 (PET base material, absorption amount of water: 1 g/m$^2$, Futamura Chemical Co., Ltd.) was transported at 635 mm/sec, coated with the printing pretreatment liquid listed in Table 6 so as to have a liquid coating amount of approximately 1.7 g/m² using a wire bar coater, and dried at 50° C. for 2 seconds immediately after the coating.

Thereafter, a blue (cyan ink+magenta ink) color solid image was printed using the prepared cyan ink and magenta ink described above under the following image recording conditions.

Immediately after the printing, the adhesiveness of the image was evaluated by attaching Sellotape (registered trademark, No. 405, manufactured by Nichiban Co., Ltd., width of 12 mm, hereinafter, also simply referred to as "tape") to the image after being dried on a hot plate at 80° C. for 30 seconds and peeling the tape off from the image. It can be said that the adhesiveness of the image is excellent because the peeling of the image formed using the ink is suppressed as the evaluation results for the adhesiveness are excellent.

Specifically, the tape was attached according to the following method.

The tape was taken out at a constant speed and cut into small pieces with a length of approximately 75 mm.

The cut tape was superimposed with the image, a region with a width of 12 mm and a length of 25 mm at the center of the tape was pressed using a finger, and the tape was attached to the image. The tape was firmly rubbed with the fingertip in order to appropriately attach the tape to the image.

The end of the tape was grabbed at an angle as close to 60° as possible in 5 minutes after attachment of the tape to the image, and the tape was reliably separated within 0.5 to 1.0 seconds.

Image Recording Conditions

Head: A head in which four colors of 1200 dpi (dot per inch, 1 inch indicates 2.54 cm)/20-inch width piezo full line heads were disposed was used.
Jet liquid droplet amount: Each amount was set to 2.4 pL.
Driving frequency: 30 kHz (base material transport speed of 635 mm/sec)

Evaluation Standards

A: Image peeling was observed.
B: The tape was colored, image peeling was observed, and the peeling was not noticeable on the image side.
C: The tape was colored, image peeling was observed, and slight peeling was observed on the image side, but the peeling was within a practically acceptable range because exposure of the PET base material was not confirmed.
D: The tape was colored and image peeling was observed, almost all of the image was peeled off on the image side, and exposure of the PET base material was confirmed.

Evaluation of Image Quality

FE2001 (PET base material, Futamura Chemical Co., Ltd.) was transported at 635 mm/sec, coated with the printing pretreatment liquid listed in Table 6 so as to have a liquid coating amount of approximately 1.7 g/m² using a wire bar coater, and dried at 50° C. for 2 seconds immediately after the coating.

Thereafter, the character (Unicode: U+9DF9) shown in FIG. 2 was recorded in 2 pt, 3 pt, 4 pt, and 5 pt under the same image recording conditions as the image recording conditions for the evaluation of the adhesiveness, the image quality was evaluated based on the following evaluation standards. pt indicates the DTP point representing the font size, and 1 pt is 1/72 inch.

Evaluation Standards

A: 2 pt characters were able to be reproduced.
B: 3 pt characters were able to be reproduced, but 2 pt characters were not able to be reproduced.
C: 4 pt characters were able to be reproduced, but 3 or lower pt characters were not able to be reproduced.
D: 4 pt characters were not able to be reproduced.

Figure 2:
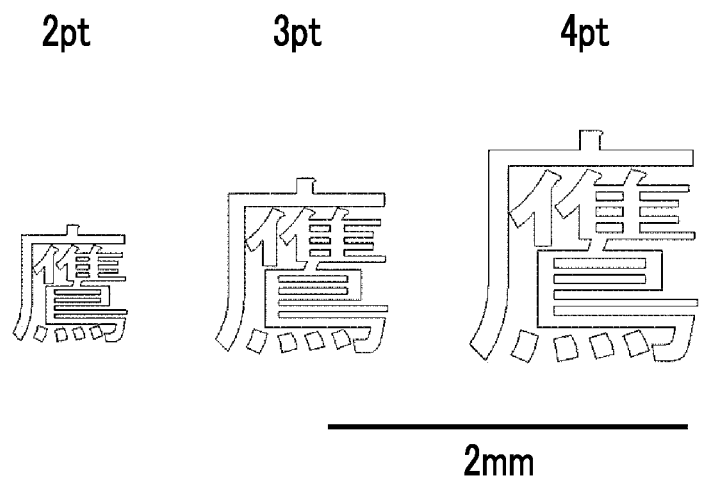
FIG. 2 is a view conceptually showing characters in a character image used for evaluation of the image resolution in examples.
Figure 3:
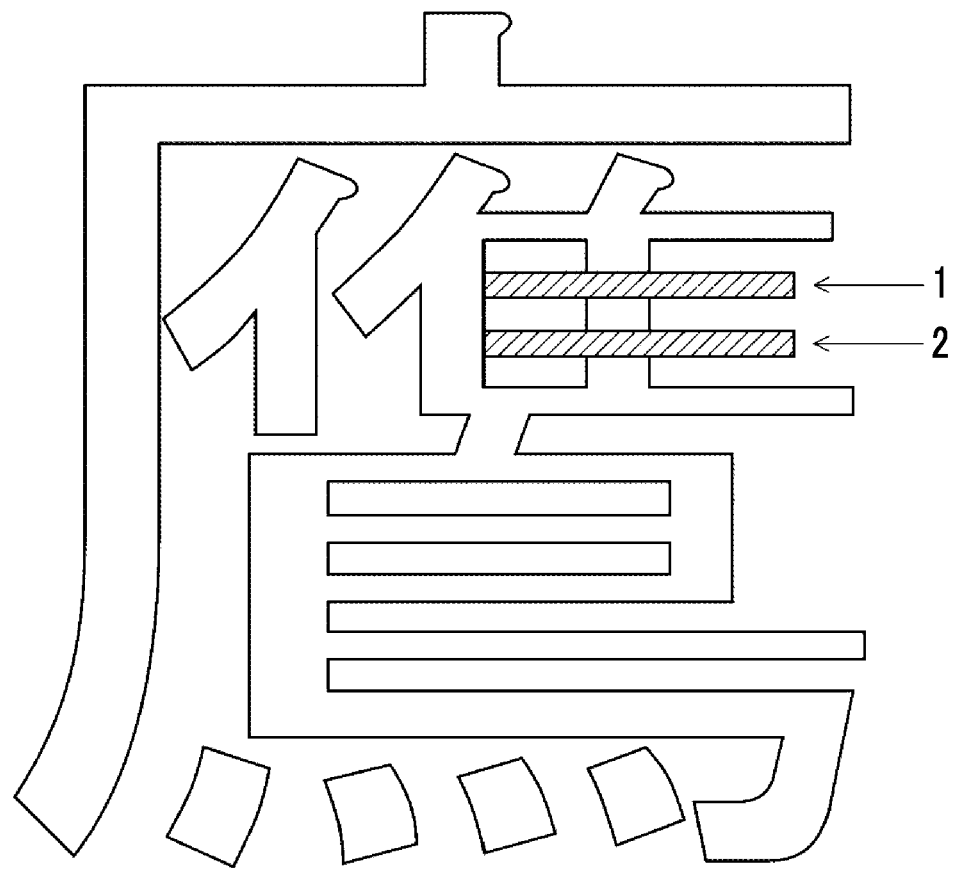
FIG. 3 is a view for describing the details of the evaluation standards for the image resolution in the examples.

Here, the expression "able to be reproduced" means that the horizontal line indicated by 1 shown in FIG. 3 and the horizontal line indicated by 2 shown in FIG. 3 in the character images shown in FIG. 2 were separated in a case where the characters were confirmed from a place separated by 0.5 m.

Evaluation of Transfer (Blocking) of Component Contained in Printing Pretreatment Liquid FE2001 (PET base material, Futamura Chemical Co., Ltd., width of 500 mm, length of 2000 m) was transported at 500 mm/sec, coated with the printing pretreatment liquid listed in Table 6 so as to have a liquid coating amount of approximately 1.7 g/m² using a wire bar coater, dried on a hot plate at 80° C. for 30 seconds, wound in a roll shape such that the surface pressure was set to 50 kPa, and allowed to stand at room temperature (25° C.) for 1 day.

After the standing, the base material was unwound, and the influence of the printing pretreatment liquid was visually evaluated with the rear surface of the PET base material in contact with the surface coated with the printing pretreatment liquid.

Specifically, the PET base material at a length of 1000 m was cut out into an A4 size (29.7 cm in the length direction of the PET base material, and 21 cm in the width direction of the PET base material), the cut-out rear surface of the PET base material was visually confirmed and evaluated based on the following evaluation standards.

Further, the cut-out position of the PET base material in the length direction was set to be the center of the A4-sized region at a position of 1000 m in the length direction. Further, the cut-out position in the width direction was set such that the center of the cut-out A4-sized region in the width direction became the center of the resin base material in the width direction.

Evaluation Standards

A: The transfer of the components of the printing pretreatment liquid was not able to be confirmed over the entire A4-sized rear surface of the PET base material, and the visibility of the transparent portion of the base material was not impaired.
B: The transfer of the components of the printing pretreatment liquid was slightly confirmed over the entire A4-sized rear surface of the PET base material, and the transparency of the PET base material was slightly impaired, but was within a practically acceptable range.
C: Transfer of the components of the printing pretreatment liquid was clearly confirmed over the entire A4-sized rear surface of the PET base material, and the transparency of the PET base material was significantly impaired.

TABLE 6

| | Composition of printing pretreatment liquid | | | | | | | | |
|---|---|---|---|---|---|---|---|---|---|
| | Compounded components | | | | Amount of polymer aqueous dispersion (% by mass) | Amount of aggregating agent (% by mass) | Polymer: aggregating agent (mass ratio) | Items of performance | | |
| | Polymer aqueous dispersion | HSP value of polymer (MPa$^{0.5}$) | Aggregating agent | HSP value of aggregating agent (MPa$^{0.5}$) | | | | Adhesiveness | image quality | blocking of pretreatment liquid |
| Example 1 | PE-1 | 22.5 | Malonic acid | 32.5 | 40 | 8 | 1:1 | A | A | A |
| Example 2 | PE-2 | 22.3 | Malonic acid | 32.5 | 40 | 8 | 1:1 | A | A | A |
| Example 3 | PE-3 | 23.8 | Malonic acid | 32.5 | 40 | 8 | 1:1 | A | A | A |
| Example 4 | PE-4 | 21.2 | Malonic acid | 32.5 | 40 | 8 | 1:1 | A | A | A |
| Example 5 | PE-5 | 24.3 | Malonic acid | 32.5 | 40 | 8 | 1:1 | B | B | A |
| Example 6 | PE-6 | 20.9 | Malonic acid | 32.5 | 40 | 8 | 1:1 | B | B | A |
| Example 7 | PE-7 | 22.1 | Malonic acid | 32.5 | 40 | 8 | 1:1 | A | A | B |
| Example 8 | PE-8 | 23.2 | Malonic acid | 32.5 | 40 | 8 | 1:1 | A | A | A |
| Example 9 | PE-9 | 21.5 | Malonic acid | 32.5 | 80 | 8 | 1:1 | B | C | A |
| Example 10 | PE-10 | 22.3 | Malonic acid | 32.5 | 80 | 8 | 1:1 | A | A | A |
| Example 11 | PE-11 | 29.6 | Malonic acid | 32.5 | 40 | 8 | 1:1 | C | C | B |
| Example 12 | PE-12 | 18.3 | Malonic acid | 32.5 | 80 | 8 | 1:1 | C | C | B |
| Example 13 | PE-13 | 23.1 | Malonic acid | 32.5 | 80 | 8 | 1:1 | A | A | A |
| Example 14 | PE-14 | 20.3 | Malonic acid | 32.5 | 80 | 8 | 1:1 | B | B | A |
| Example 15 | PE-1 | 22.5 | Malonic acid | 32.5 | 40 | 16 | 1:2 | A | A | A |
| Example 16 | PE-1 | 22.5 | Malonic acid | 32.5 | 40 | 0.8 | 10:1 | A | A | A |
| Example 17 | PE-1 | 22.5 | Malonic acid | 32.5 | 40 | 20 | 1:2.5 | B | A | B |
| Example 18 | PE-1 | 22.5 | Malonic acid | 32.5 | 40 | 0.5 | 10:0.6 | A | B | A |
| Example 19 | PE-1 | 22.5 | Magnesium sulfate | 64.9 | 40 | 8 | 1.1 | A | A | B |
| Example 20 | PE-1 | 22.5 | Polyallylamine | 19.8 | 40 | 8 | 1:1 | A | A | B |
| Example 21 | PE-4/HE-1 | 23.1 | Malonic acid | 32.5 | 40 | 8 | 1.1 | B | B | A |
| Example 22 | PE-1 | 22.5 | Glutaric acid | 28.1 | 40 | 8 | 1:1 | A | A | A |
| Comparative Example 1 | HE-1 | 30.9 | Malonic acid | 32.5 | 40 | 8 | 1:1 | D | D | C |
| Comparative Example 2 | HE-2 | 17.9 | Malonic acid | 32.5 | 80 | 8 | 1:1 | D | D | C |

In Table 6, the amount of the polymer aqueous dispersion and the amount of the aggregating agent indicate the amount of the solid content.

In Table 6, the details of the compounds listed in the columns of the aggregating agent are as follows.

Malonic acid (organic acid): malonic acid, manufactured by Tokyo Chemical Industry Co., Ltd.

Glutaric acid (organic acid): glutaric acid, manufactured by Tokyo Chemical Industry Co., Ltd.

Magnesium sulfate (polyvalent metal salt): magnesium sulfate heptahydrate, manufactured by Nacalai Tesque Inc.

Polyallylamine (cationic compound): PAA-HCL-01, manufactured by Nittobo Medical Co., Ltd.

According to Examples 1 to 22, it was found that an image with excellent adhesiveness was formed on the polyester base material by using the printing pretreatment liquid containing a polymer having an HSP value of 18 MPa$^{0.5}$ to 30 MPa$^{0.5}$ (that is, a specific polymer).

As is clear from Example 21, it was found that in a case where the HSP value of the mixture obtained by mixing two kinds of the polymer aqueous dispersions was in a range of 18 MPa$^{0.5}$ to 30 MPa$^{0.5}$, an image having excellent adhesiveness and image quality was able to be obtained.

Based on comparison between Example 1, Examples 10, and Example 11, it was found that the adhesiveness and the image quality of the image were excellent and the blocking of the pretreatment liquid was increased by using polyester containing a sulfonic acid group or a (meth)acrylic resin containing a sulfonic acid group as the specific polymer.

Based on comparison between Example 1 and Example 7, it was found that the blocking of the pretreatment liquid was increased by setting the glass transition temperature of the specific polymer to 40° C. or higher.

Based on comparison between Example 1, Example 19, and Example 20, it was found that the adhesiveness and the image quality of the image were excellent by using the aggregating agent having an HSP value of 25 MPa$^{0.5}$ to 40 MPa$^{0.5}$.

Based on comparison between Example 1 and Example 17, it was found that in a case where the amount of the aggregating agent exceeded twice the amount of the polymer and the amount of the aggregating agent increased, the adhesiveness of the image was slightly degraded and the blocking of the printing pretreatment liquid also decreased.

Based on comparison between Example 1 and Example 18, it was found that in a case where the amount of the aggregating agent was less than 0.1 times the amount of the polymer and the amount of the aggregating agent, the image quality was slightly degraded.

The disclosure of JP2017-252307 filed on Dec. 27, 2017 is incorporated herein by reference.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:

1. A printing pretreatment liquid for a polyester base material, comprising:
a polymer which has a Hansen solubility parameter value of 18 MPa$^{0.5}$ to 30 MPa$^{0.5}$; water; and at least one aggregating agent selected from the group consisting of a polyvalent metal salt, an organic acid, a cationic compound, and a metal complex, wherein the polymer which has a Hansen solubility parameter value of 18 MPa$^{0.5}$ to 30 MPa$^{0.5}$ contains at least one selected from a polyester resin containing an SO$_3^-$Z$^+$group, a polyamide resin containing an SO$_3^-$Z$^+$group, or a polyesteramide copolymer containing an SO$_3^-$Z$^+$group, in the SO$_3^-$Z$^+$group, Z$^+$represents a counter cation which may be bonded to or dissociated from SO$_3$.

2. The printing pretreatment liquid according to claim 1, wherein the polymer which has a Hansen solubility parameter value of 18 MPa$^{0.5}$ to 30 MPa$^{0.5}$ contains at least one of a resin having a constitutional unit represented by Formula (I) or a resin having a constitutional unit represented by Formula (II),

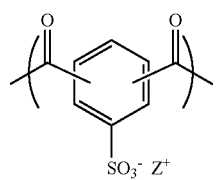

(I)

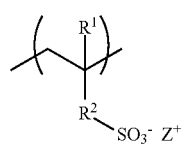

(II)

in Formula (I), Z$^+$represents a counter cation which may be bonded to or dissociated from SO$_3^-$, in Formula (II), R$^1$ represents a hydrogen atom or a methyl group, R$^2$ represents a single bond, an aromatic ring, or an alkylene group which may have an ester bond, an amide bond, or an oxygen atom, and Z$^+$represents a counter cation which may be bonded to or dissociated from SO$_3^-$.

3. The printing pretreatment liquid according to claim 2, wherein the resin having a constitutional unit represented by Formula (I) further has a constitutional unit represented by Formula (i)

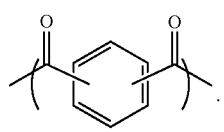

(i)

4. The printing pretreatment liquid according to claim 2, wherein the resin having a constitutional unit represented by Formula (II) further has a constitutional unit represented by Formula (III),

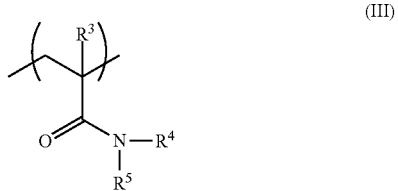

(III)

in Formula (III), R$^3$ represents a hydrogen atom or a methyl group, R$^4$ and R$^5$ each independently represent a hydrogen atom or an alkyl group which may have an oxygen atom, and R$^4$ and R$^5$ may be bonded to each other to form a ring having an oxygen atom.

5. The printing pretreatment liquid according to claim 2,
wherein the resin having a constitutional unit represented by Formula (II) further has a constitutional unit derived from styrene.

6. The printing pretreatment liquid according to claim 2,
wherein the resin having a constitutional unit represented by Formula (II) further contains (meth)acrylic acid alkyl ester which does not contain a sulfonic acid group.

7. The printing pretreatment liquid according to claim 1,
wherein a glass transition temperature Tg of the polymer having a Hansen solubility parameter value of 18 MPa$^{0.5}$ to 30 MPa$^{0.5}$ is in a range of 40° C. to 200° C.

8. The printing pretreatment liquid according to claim 1,
wherein a Hansen solubility parameter value of at least one aggregating agent selected from the group consisting of a polyvalent metal salt, an organic acid, a cationic compound, and a metal complex is in a range of 25 MPa$^{0.5}$ to 40 MPa$^{0.5}$.

9. The printing pretreatment liquid according to claim 1,
wherein a mass ratio (content A of polymer:content B of aggregating agent) of a content A of the polymer which has a Hansen solubility parameter value of 18 MPa$^{0.5}$ to 30 MPa$^{0.5}$ to a content B of at least one aggregating agent selected from the group consisting of a polyvalent metal salt, an organic acid, a cationic compound, and a metal complex is in a range of 10:1 to 1:2.

10. A base material for printing, comprising:
a polyester base material; and
a treatment layer which is provided on a surface of the polyester base material and contains a solid content of the printing pretreatment liquid according to claim 1.

11. A method of producing a base material for printing, comprising:
applying the printing pretreatment liquid according to claim 1 to a surface of a polyester base material.

12. An ink set comprising:
an ink composition which contains a colorant and water; and
the printing pretreatment liquid according to claim 1.

13. An image recording method comprising:
applying the printing pretreatment liquid according to claim 1 to a surface of a polyester base material; and
jetting an ink composition containing a colorant and water by an ink jet method onto the surface to which the printing pretreatment liquid has been applied and recording an image.

14. An image recording method comprising:
jetting an ink composition containing a colorant and water by an ink jet method onto a treatment layer of a base material for printing, the base material including a polyester base material and the treatment layer that is provided on a surface of the polyester base material and contains a solid content of the printing pretreatment liquid according to claim 1, and recording an image.

15. An image recorded material comprising:
a polyester base material; and
an image which is provided on a surface of the polyester base material and contains a solid content of the printing pretreatment liquid according to claim 1 and a colorant.

16. A printing pretreatment liquid for a polyester base material, comprising:
a polymer which has a Hansen solubility parameter value of 18 MPa$^{0.5}$ to 30 MPa$^{0.5}$; water; and
at least one aggregating agent selected from the group consisting of a polyvalent metal salt, an organic acid, a cationic compound, and a metal complex,
wherein the polymer which has a Hansen solubility parameter value of 18 MPa$^{0.5}$ to 30 MPa$^{0.5}$ contains at least one selected from a polyester resin containing an $SO_3^-Z^+$ group, a polyamide resin containing an $SO_3^-Z^+$ group, a (meth)acrylic resin containing an $SO_3^-Z^+$ group and having a constitutional unit represented by Formula (III), or a polyesteramide copolymer containing an $SO_3^-Z^+$ group,
in the $SO_3^-Z^+$ group, $Z^+$ represents a counter cation which may be bonded to or dissociated from $SO_3^-$,

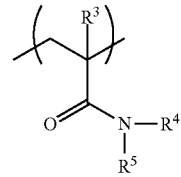

(III)

in Formula (III), $R^3$ represents a hydrogen atom or a methyl group, $R^4$ and $R^5$ each independently represent a hydrogen atom or an alkyl group which may have an oxygen atom, $R^4$ and $R^5$ may be bonded to each other to form a ring having an oxygen atom, and the alkyl group represented by $R^4$ and $R^5$ may be further substituted with an alkyl group, a hydroxy group, or an acetyl group.

* * * * *